United States Patent
Unno

(10) Patent No.: US 6,963,422 B2
(45) Date of Patent: Nov. 8, 2005

(54) IMAGE INPUT/OUTPUT APPARATUS, CONTROL METHOD OF IMAGE INPUT/OUTPUT APPARATUS, IMAGE INPUT/OUTPUT SYSTEM, AND STORAGE MEDIUM THEREOF

(75) Inventor: Kouichi Unno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 09/877,142

(22) Filed: Jun. 11, 2001

(65) Prior Publication Data
US 2002/0015096 A1 Feb. 7, 2002

(30) Foreign Application Priority Data
Jun. 13, 2000 (JP) .............................. 2000-177515

(51) Int. Cl.$^7$ ........................................... G06F 15/00
(52) U.S. Cl. ..................... 358/1.18; 358/1.2; 358/1.15; 347/3
(58) Field of Search ............................. 358/1.18, 1.2, 358/1.11, 1.12, 1.15, 1.13–1.14, 401; 347/3; 399/81, 85

(56) References Cited
U.S. PATENT DOCUMENTS
5,678,000 A * 10/1997 Ohtani ..................... 358/1.2

FOREIGN PATENT DOCUMENTS
EP   0 814 424 A1   12/1997
EP   0 820 185 A2   1/1998
EP   0 899 942 A2   3/1999

OTHER PUBLICATIONS
Patent Abstracts of Japan, vol. 1998, No. 12, Jul. 28, 1998 (JP 10 193670 A).
Patent Abstracts of Japan, vol. 1999, No. 05, Feb. 23, 1999 (JP 11 048573 A).

* cited by examiner

Primary Examiner—Twyler Lamb
(74) Attorney, Agent, or Firm—Fitzpatrick, Cella, Harper & Scinto

(57) ABSTRACT

The present invention relates to image input/output apparatuses for outputting inputted image data, a control method of the image input/output apparatuses, an image input/output system and a storage medium thereof. According to the present invention, in case of receiving an image output request of outputting image data inputted by another image input/output apparatus using the another image input/output apparatus and an own image input/output apparatus, setting related to sheet size selection of the own image input/output apparatus is disabled, and data size of the image data transferred from the another image input/output apparatus is calculated. Then, output sheet size is selected on the basis of the calculated result.

57 Claims, 14 Drawing Sheets

IMAGE INPUT/OUTPUT APPARATUS, CONTROL METHOD OF IMAGE INPUT/OUTPUT APPARATUS, IMAGE INPUT/OUTPUT SYSTEM, AND STORAGE MEDIUM THEREOF

BACKGROUND OF THE INVENTION

1. Field of the Invention

The present invention relates to an image input/output apparatus for outputting inputted image data, a control method of the image input/output apparatus, an image input/output system and a storage medium thereof.

2. Related Background Art

There has been known an image input/output system in which plural image input/output apparatuses are connected through a communication medium such as a network or the like. In this kind of the image input/output system, cascade copy for outputting image data inputted to the one image input/output apparatus among the plural image input/output apparatuses in parallel to the other image input/output apparatuses on the communication medium can be performed.

In this kind of an image processing system, the image input/output apparatuses having the same function and being attended with the same setting are connected each other through the communication medium. According to this structure, the cascade copy is performed to increase processing efficiency in processing the image data.

There also has been known an image input/output apparatus having a function called an APS (Auto Paper Select) mode. In the APS mode, an original size detection sensor provided on an automatic feeder, a scanner unit or the like detects original size, and image size is determined by the original size and a copying magnification. Then, an optimum sheet feed cassette corresponding to the determined image size can be automatically selected among plural sheet feed cassettes. It should be noted that the term "sheet" and the term "paper" are synonymous with each other through the present application.

In the above image processing system, in case of performing the cascade copy among the image input/output apparatuses having the same function and being attended with the same setting, the same output result can be obtained at each of the image input/output apparatuses, even if the APS function is used.

However, in recent years, according to the preparation of network environment, there has been proposed an image formation system in which plural image input/output apparatuses having different functions are connected. In this image formation system, in case of performing the cascade copy using such the image input/output apparatuses having the different functions and being attended with different setting contents, there occurs problems that selection processing of the image input/output apparatus and a setting operation of an output condition become complex.

For example, the image input/output apparatus has the APS function while it can manually set sheet size not to be aimed at an APS operation. Therefore, there occurs a case that settings of different output conditions are set among the image input/output apparatuses. In such the case, the same image output result can not be obtained among each of the image input/output apparatuses. According to this fact, since a user has to previously check detailed output information in order to obtain the same image output result, there occurred a problem that operability was deteriorated.

SUMMARY OF THE INVENTION

The present invention is applied to solve the above problems, and an object is to provide image input/output apparatuses, a control method of the image input/output apparatuses, an image input/output system and a storage medium thereof capable of easily obtaining the same image output result among each of the image input/output apparatuses.

To achieve the above object, it is provided an image input/output apparatus capable of communicating with another image input/output apparatus through a communication medium for outputting inputted image data, comprising:

setting means for performing setting related to sheet size selection;

calculation means for calculating data size of the inputted image data; and sheet selection means for selecting output sheet size on the basis of the calculation result obtained by the calculation means and the setting set by the setting means, wherein in a case where an image output request of outputting image data inputted by the another image input/output apparatus using the another image input/output apparatus and the own image input/output apparatus is received, the setting set by the setting means is disabled, and the calculation means calculates the data size of the image data transferred from the another image input/output apparatus and the sheet selection means selects the output sheet size on the basis of the calculation result obtained by the calculation means.

Another object of the present invention is to provide image input/output apparatuses, a control method of the image input/output apparatuses, an image input/output system and a storage medium thereof which can select the same recording sheet size can be used in outputting images without checking detailed information of the image input/output apparatuses and improves operability.

To achieve the above object, it is provided an image input/output apparatus capable of communicating with another image input/output apparatus through a communication medium for outputting inputted image data, comprising:

image input means for inputting image data;

display means for displaying sheet information of recording sheets commonly held by the another image input/output apparatus and the own image input/output apparatus for outputting the image data inputted by the image input means;

sheet selection means for selecting output sheet size used in outputting the image data on the basis of the sheet information displayed by the display means;

output control means for controlling the own image input/output apparatus and the another image input/output apparatus to output the image data on sheets of which size corresponds to the output sheet size selected by the sheet selection means, wherein control information to be transmitted to the another image input/output apparatus by the output control means includes information used in disabling selection setting of recording sheet size according to the another image input/output apparatus.

Still another object of the present invention is to provide image input/output apparatuses, a control method of the image input/output apparatuses, an image input/output system and a storage medium thereof which can automatically select the same recording sheet size can be used in outputting images without checking the detailed information of the image input/output apparatuses.

To achieve the above object, it is provided an image input/output apparatus capable of communicating with another image input/output apparatus through a communication medium for outputting inputted image data, comprising:

image input means for inputting image data;

device selection means for selecting the another image input/output apparatus for outputting the image data inputted by the image input means;

judgment means for judging whether or not recording sheet size set in the another image input/output apparatus selected by the device selection means is coincided with recording sheet size being selected by the own image input/output apparatus; and setting means for disabling the recording sheet size being selected by the own image input/output apparatus in a case where it is detected that the two recording sheet sizes are not coincided with each other by the judgment means and performing setting related to sheet size selection so as to select output sheet size on the basis of data size of the image data inputted by the image input means.

Still another object of the present invention is to provide image input/output apparatuses, a control method of the image input/output apparatuses, an image input/output system and a storage medium thereof which can easily realize the same image output condition among each of plural image input/output apparatuses.

To achieve the above object, it is provided an image input/output apparatus capable of communicating with another image input/output apparatus through a communication medium for outputting inputted image data, comprising:

judgment means for judging whether or not an image output request using the another image input/output apparatus and the own image input/output apparatus is received from the another image input/output apparatus; and output control means for controlling an output condition of image data transferred from the another image input/output apparatus, wherein the output control means disables sheet selection setting according to the own image input/output apparatus in case of judging that the image output request is received by the judgment means.

Still another object of the present invention is to provide image input/output apparatuses, a control method of the image input/output apparatuses, an image input/output system and a storage medium thereof which can select recording sheet size can be used in outputting images without checking detailed information for an image output and improves operability.

To achieve the above object, it is provided an image input/output apparatus capable of communicating with another image input/output apparatus through a communication medium for outputting inputted image data, comprising:

image input means for inputting image data;

display means for displaying sheet information of recording sheets commonly held by the another image input/output apparatus and the own image input/output apparatus for outputting the image data inputted by the image input means;

sheet selection means for selecting output sheet size used in outputting the image data on the basis of the sheet information displayed by the display means; and output control means for controlling the own image input/output apparatus and the another image input/output apparatus to output the image data on sheets of which size corresponds to the output sheet size selected by the sheet selection means.

Still another object of the present invention is to provide image input/output apparatuses, a control method of the image input/output apparatuses, an image input/output system and a storage medium thereof which can automatically select the same recording sheet size can be used in outputting images without checking the detailed information for an image output.

To achieve the above object, it is provided an image input/output apparatus capable of communicating with another image input/output apparatus through a communication medium for outputting inputted image data, comprising:

judgment means for judging whether or not recording sheet size set in the another image input/output apparatus is coincided with recording sheet size being selected by the own image input/output apparatus in case of outputting the image data inputted by the own image input/output apparatus and the another image input/output apparatus; and sheet selection means for disabling the recording sheet size being selected by the own image input/output apparatus in a case where it is detected that the two recording sheet sizes are not coincided with each other by the judgment means and selecting output sheet size on the basis of data size of the inputted image data.

Still another object of the present invention is to provide image input/output apparatuses, a control method of the image input/output apparatuses, an image input/output system and a storage medium thereof in which a printer at a remote side can easily obtain the same image output result as that of a printer at a local side without disabling a copying operation of the printer at the remote side.

To achieve the above object, it is provided a remote image input/output apparatus, which has a second scanner unit for reading image data of originals and a second printer unit for feeding output sheets from a sheet feed stage storing recording sheets and printing the image data on the output sheets, capable of communicating with a local image input/output apparatus which has a first scanner unit and a first printer unit through a predetermined network, comprising:

setting means for setting recording sheet size to be selected in output sheet size selection based on size of input image data;

calculation means for calculating data size of the input image data;

sheet selection means for selecting output sheet size used in printing the input image data by the second printer unit among recording sheet sizes set to be selected by the setting means on the basis of the calculation result obtained by the calculation means; and judgment means for judging whether or not a cascade copy request for image data read by the first scanner unit using the first printer unit and the second printer unit is received from the local image input/output apparatus, wherein the setting set by the setting means is disabled in case of judging that the cascade copy request is received by the judgment means, and the calculation means calculates data size of image data transferred from the local image input/output apparatus, the sheet selection means selects the output sheet size on the basis of the calculation result obtained by the calculation means, and the second printer unit prints the transferred image data on a sheet of which size corresponds to the output sheet size selected by the sheet selection means.

Still another object of the present invention is to provide image input/output apparatuses, a control method of the image input/output apparatuses, an image input/output system and a storage medium thereof which can select the same recording sheet size can be used in outputting images without checking detailed information of the printer at the remote side by an operator and improves operability.

To achieve the above object, it is provided a local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:

display means for displaying sheet information of recording sheets commonly held by the remote image input/output apparatus and the own image input/output apparatus for printing the image data read by the first scanner unit;

sheet selection means for selecting print sheet size used in printing the image data on the basis of the sheet information displayed by the display means; and print control means for controlling the own image input/output apparatus and the remote image input/output apparatus to print the image data on sheets of which size corresponds to the output sheet size selected by the sheet selection means, wherein control information transmitted to the remote image input/output apparatus by the print control means includes information used in disabling selection information of recording sheet size previously set by the remote image input/output apparatus.

Still another object of the present invention is to provide image input/output apparatuses, a control method of the image input/output apparatuses, an image input/output system and a storage medium thereof which can automatically select the same recording sheet size can be used in outputting images without checking the detailed information of the printer at the remote side.

To achieve the above object, it is provided a local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:

device selection means for selecting the remote image input/output apparatus for printing the image data read by the first scanner unit;

judgment means for judging whether or not recording sheet size set in the remote image input/output apparatus selected by the device selection means is coincided with recording sheet size being selected by the own image input/output apparatus; and setting means for disabling the recording sheet size being selected by the own image input/output apparatus in a case where it is detected that the two recording sheet sizes are not coincided with each other by the judgment means and performing setting related to sheet size selection so as to select output sheet size on the basis of data size of the image data to be read by the first scanner unit.

The above and other objects of the present invention will become apparent from the following detailed description and the attached drawings.

DETAILED DESCRIPTION OF THE PREFERRED EMBODIMENT

Hereinafter, the embodiment of the present invention will be described with reference to the attached drawings.

Figure 1:
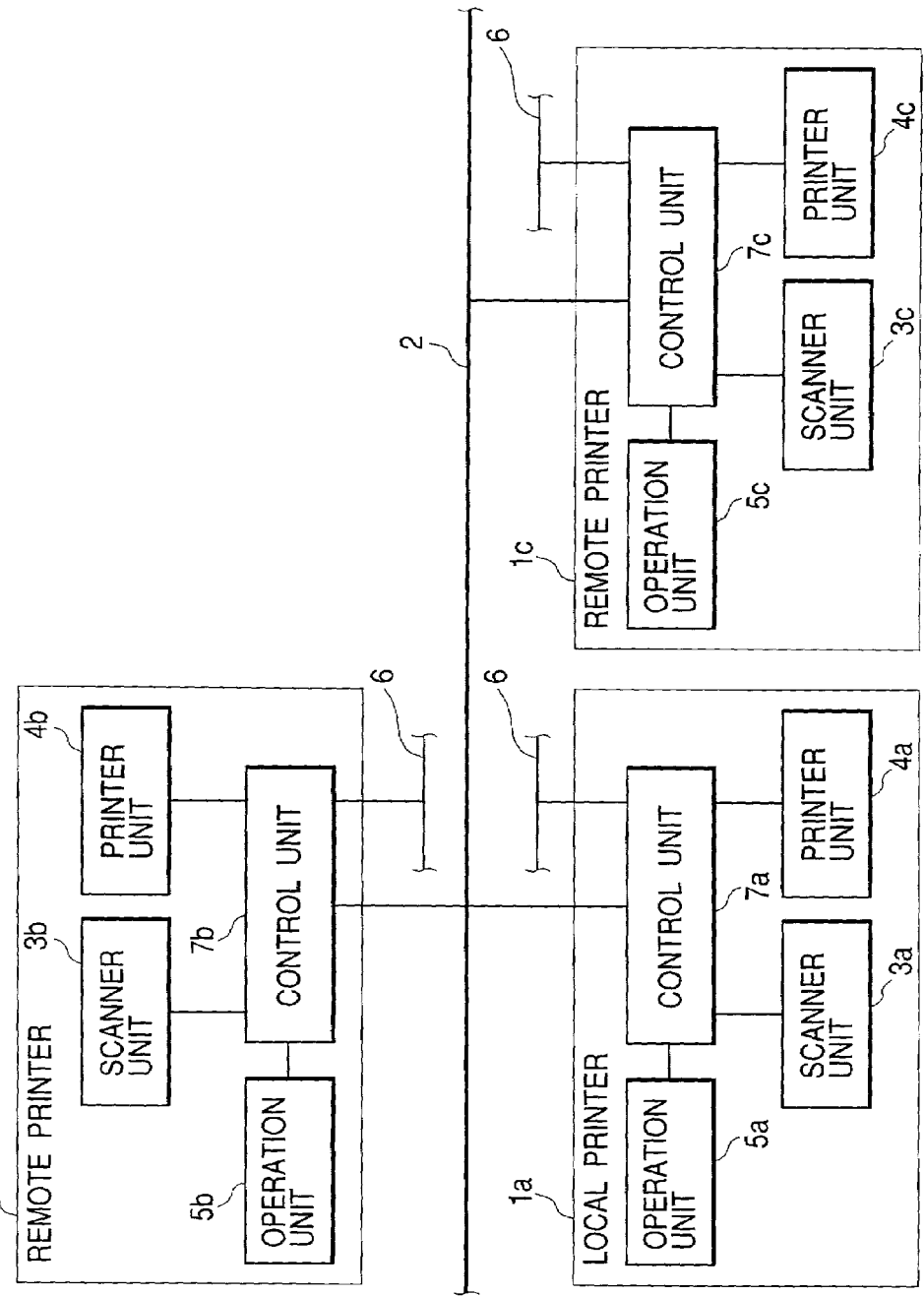
FIG. 1 is an entire structural diagram indicating the embodiment of an image processing system according to the present invention.

FIG. 1 is a system structural diagram indicating the embodiment of an image processing system according to the present invention. In this image processing system, three image input/output apparatuses 1 (a local printer 1a and remote printers 1b and 1c) are connected each other through a LAN (Local Area Network) 2 acting as a network.

The image input/output apparatuses 1a, 1b and 1c respectively have scanner units 3a, 3b and 3c for performing processing of reading image data, printer units 4a, 4b and 4c for outputting the image data and operation units 5a, 5b and 5c for performing a reading instruction or an outputting instruction of the image data. Further, control units 7a, 7b and 7c connected to a LAN 2 and a WAN (Wide Area Network; a public telephone line network) 6 and connected to each of the above structural components for performing entire control of the apparatuses are provided.

In the embodiment, the image data is read by the scanner unit 3a in the local printer 1a, and the read image data is outputted to the printer unit 4a in the own apparatus and transmitted to the remote printer 1b. The same image data as that to be outputted from the printer unit 4a is also outputted from the printer unit 4b in the remote printer 1b with the same output condition.

Figure 2:
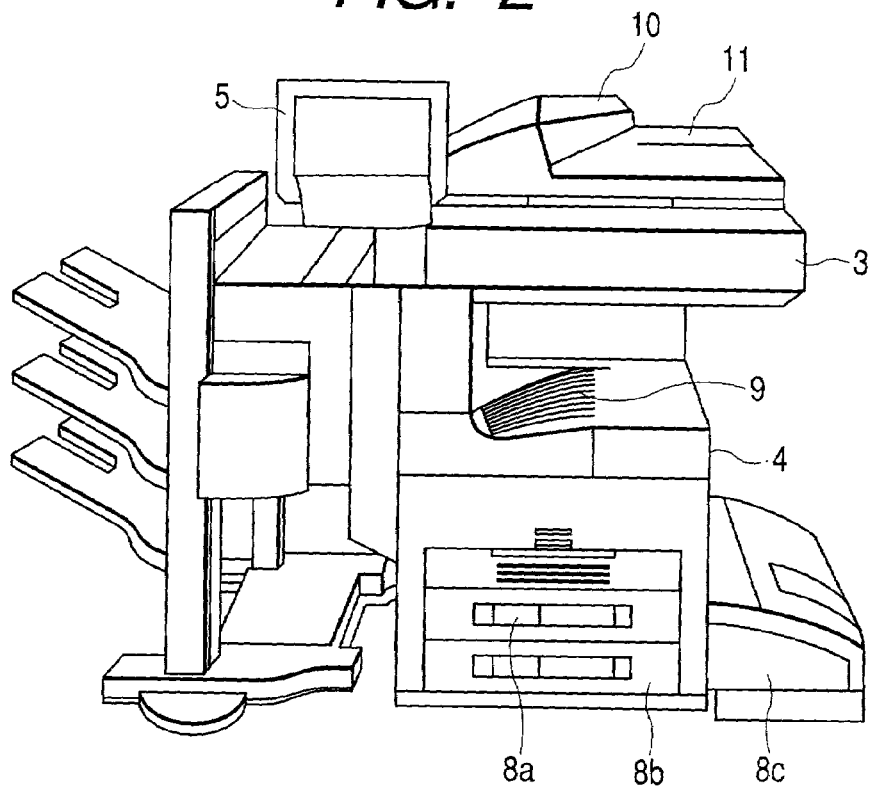
FIG. 2 is a schematic perspective diagram of an image input/output apparatus.

FIG. 2 is a schematic perspective diagram showing an exterior of the image processing apparatus 1.

A printer unit 4 is provided at a lower position of the image processing apparatus 1. In the printer unit 4, raster image data is converted into image data on a recording sheet, and its method may be any system of an electrophotographic system using a photosensitive drum or a photosensitive belt, an inkjet system for directly printing an image on a sheet by ejecting ink from a microscopic nuzzle array, and the like. In the printer unit 4, plural sheet feed cassettes (first to third sheet feed cassettes 8a, 8b and 8c) are provided so as to select different sheet size and different sheet direction, and a sheet discharge tray 9 for discharging a recording sheet on which the image data is printed is also provided.

A scanner unit 3 and an operation unit 5 are provided at an upper position of the printer unit 4, and a sheet feeder unit 11 having an original tray 10 is provided on the scanner unit 3.

Figure 3:
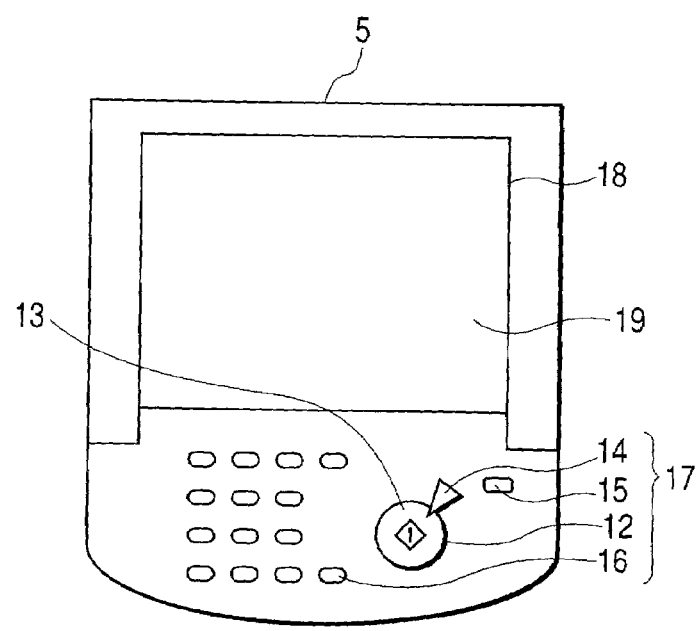
FIG. 3 is a front diagram showing an outline of an operation unit.

FIG. 3 is a schematic front diagram showing an exterior of the operation unit 5.

In FIG. 3, a start key 12 is operated in case of starting a reading operation of original images. In a central portion of the start key 12, an LED unit 13 lighting by green or red color is provided. It is detected whether or not the start key 12 can be used according to lighting color of the LED unit 13. A stop key 14 is operated in case of stopping a running operation. A reset key 15 is operated in case of initializing setting state of the operation unit 5. An ID key 16 is operated when an operator inputs a user ID. A key group 17 of various keys is structured by the start key 12, the stop key 14, the reset key 15 and the ID key 16.

A touchscreen 19 is adhered to a surface of an LCD unit 18, which displays an operation screen of the system and softkeys and transmits position information, that is, coordinates information to a control unit 7 when the displayed softkeys are depressed.

Figure 4:
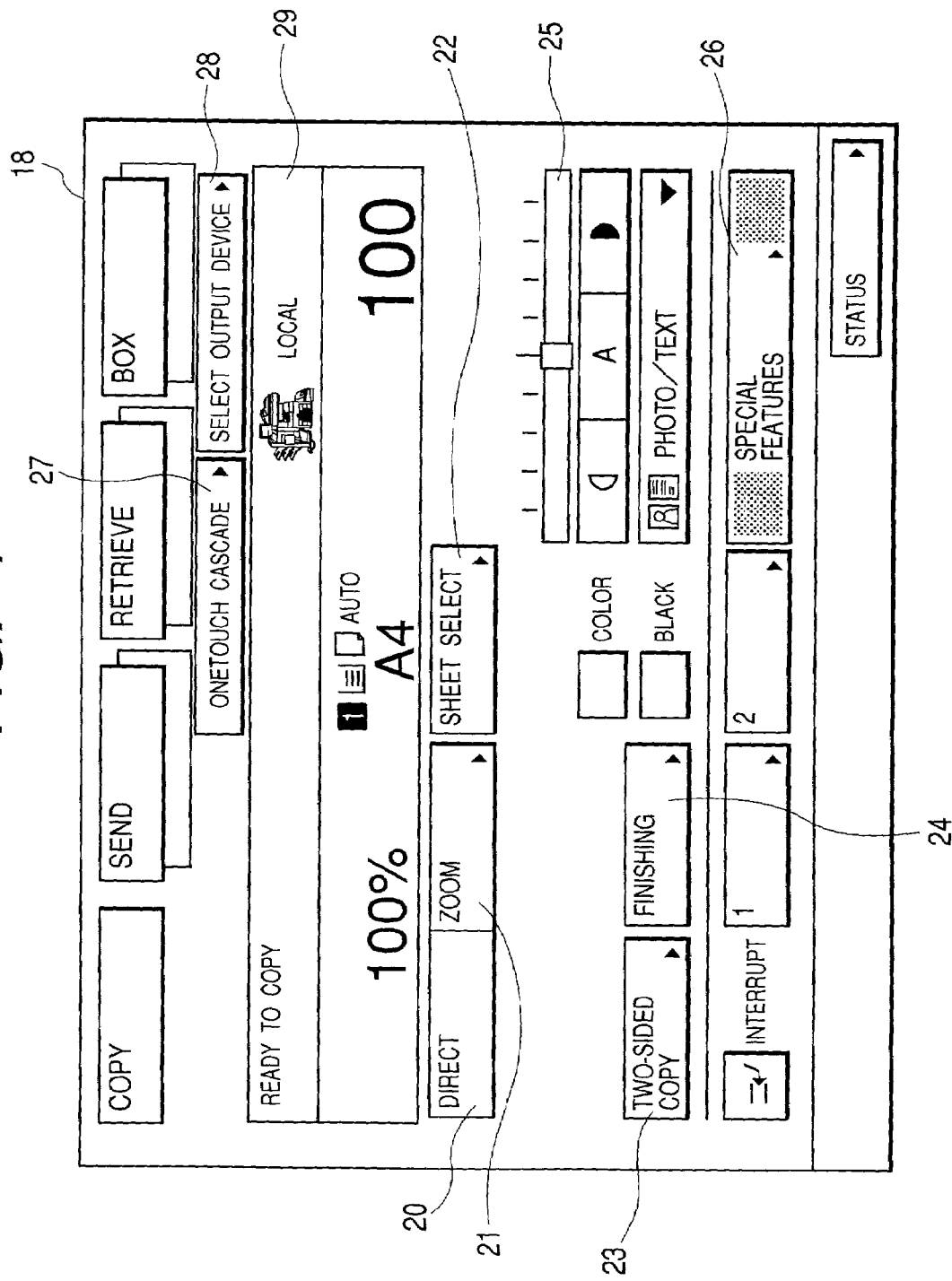
FIG. 4 is a diagram showing an initial screen on an LCD unit of the operation unit.

FIG. 4 is a diagram indicating an initial screen of the LCD unit 18. On the initial screen, a state of a local copy mode is displayed at an output destination display part 29 and various softkeys used in setting and controlling an output condition are displayed.

In FIG. 4, a direct key 20 is depressed in case of outputting an input image with an equivalent magnification. A zoom key 21 is depressed in case of performing zoom setting for the purpose of outputting the input image by zooming it. A sheet selection key 22 is depressed in case of setting selection of output sheet size. A two-sided copy key 23 is depressed in case of printing images on two sides of a recording sheet. A finishing key 24 is depressed in case of performing sort setting of output sheets. A density setting key 25 is depressed in case of setting or varying image output density. A special features mode setting key 26 is depressed in case of setting other special features functions.

A one-touch cascade key 27 is depressed in case of easily setting a cascade copy mode for simultaneously outputting a read image to plural image processing apparatuses on the LAN 2. An output device selection key 28 is depressed in case of selecting the image processing apparatus for outputting the image data.

An actual output destination is displayed at the output destination display part 29, where setting of a local copy mode of outputting image data to the own apparatus, a remote copy mode of outputting the image data to another image processing apparatus on the LAN 2 or the above cascade copy mode can be performed. These setting modes, devices of output destination, a zooming ratio, recording sheet size, the number of copies and the like are displayed at the output destination display part 29.

By depressing the above various softkeys, a window used for performing detailed setting is displayed as much as desired to be described later, and an operation of the remote copy mode or the cascade copy mode can be performed.

Figure 5:
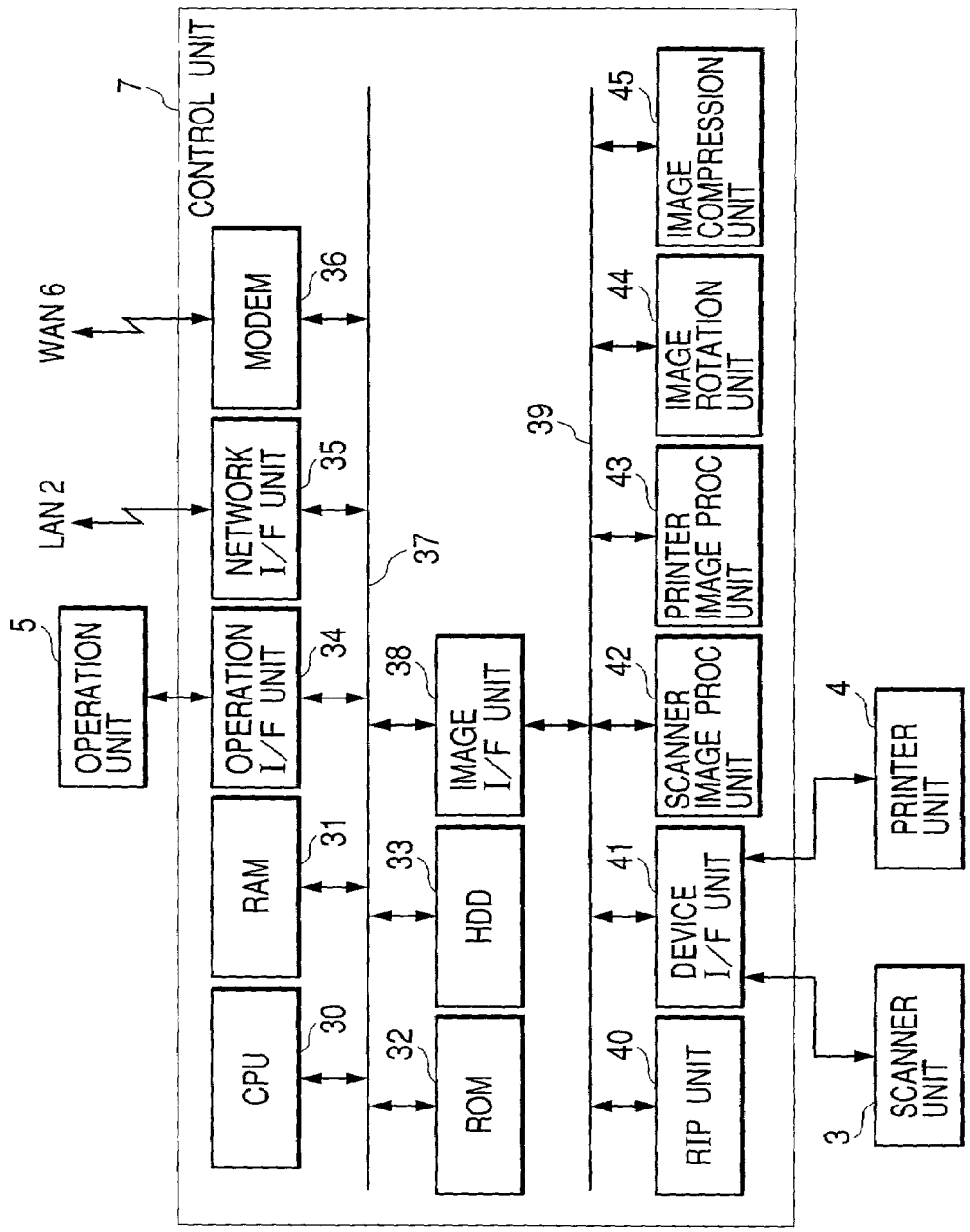
FIG. 5 is a block diagram of a control unit.

FIG. 5 is a block diagram showing the detailed structure of the control unit 7.

A CPU 30 acts as a controller for entirely controlling the system. A RAM 31 temporarily stores image data or other operation data is used as a work area of the CPU 30. A boot program, a control program to be described later, or the like is stored in a ROM 32. Software of the system or the image data is stored in a hard disk drive (HDD) 33. An operation I/F unit 34 controls an interface operation between the own unit and the operation unit 5. A network I/F unit 35 connected to the LAN 2 executes input/output processing of various information between the own unit and the LAN 2. A MODEM 36 connected to the WAN 6 executes input/output processing of various information between the own unit and the WAN 6.

The above structural components are connected each other through a system bus 37.

An image I/F unit 38 connects the system bus 37 to an image bus 39 to convert the data structure.

The image bus 39 structured by a PCI (Peripheral Component Interconnected) bus or IEEE1394 (Institute of Electrical and Electronics Engineers 1394) Standard transmits the image data at high speed. To this image bus 39, a raster image processor (RIP) unit 40, a device I/F unit 41, a scanner image processing unit 42, a printer image processing unit 43, an image rotation unit 44 and an image compression unit 45 are connected.

The RIP unit 40 develops PDL (Page Description Language) codes into bit-map image data. The device I/F unit 41 connected to the scanner unit 3 and the printer unit 4 performs conversion of sync system/nonsync system of the image data. The scanner image processing unit 42 performs a correcting operation, a processing operation and an editing operation for input image data. The printer image processing unit 43 performs correcting of the printer, resolution conversion or the like for print output image data. The image rotation unit 44 rotates the image data. The image compression unit 45 executes compression/decompression processing such as JPEG (Joint Photographic Experts Group) processing for multi level image data, and JBIG (Joint Bi-level Image experts Group) processing, MMR (Modified Modified READ (Relative Element Address)) encoding processing, MH (Modified Huffman) encoding processing or the like for binary image data.

In this structured image processing apparatus 1, original sheets are set in the original tray 10 of an original feeder unit 11, and when a user issues an instruction of starting the image read by operating the operation unit 5, the CPU 30 in the control unit 7 issues an instruction of reading original images for the scanner unit 3. According to this operation, image originals are fed one by one from the original feeder unit 11 to the scanner unit 3, where original images are illuminated and converted into an electric signal as raster image data by scanning a CCD line sensor (not shown).

The printer unit 4 starts a printing operation according to an instruction from the CPU 30 and outputs an image signal as output information. That is, in the printer unit 4, the CPU 30 totally controls accessing to various devices connected to the system bus 37 on the basis of a control program stored in the ROM 32 and reads input information from the scanner unit 3 to output it to the printer unit 4.

Figure 6:
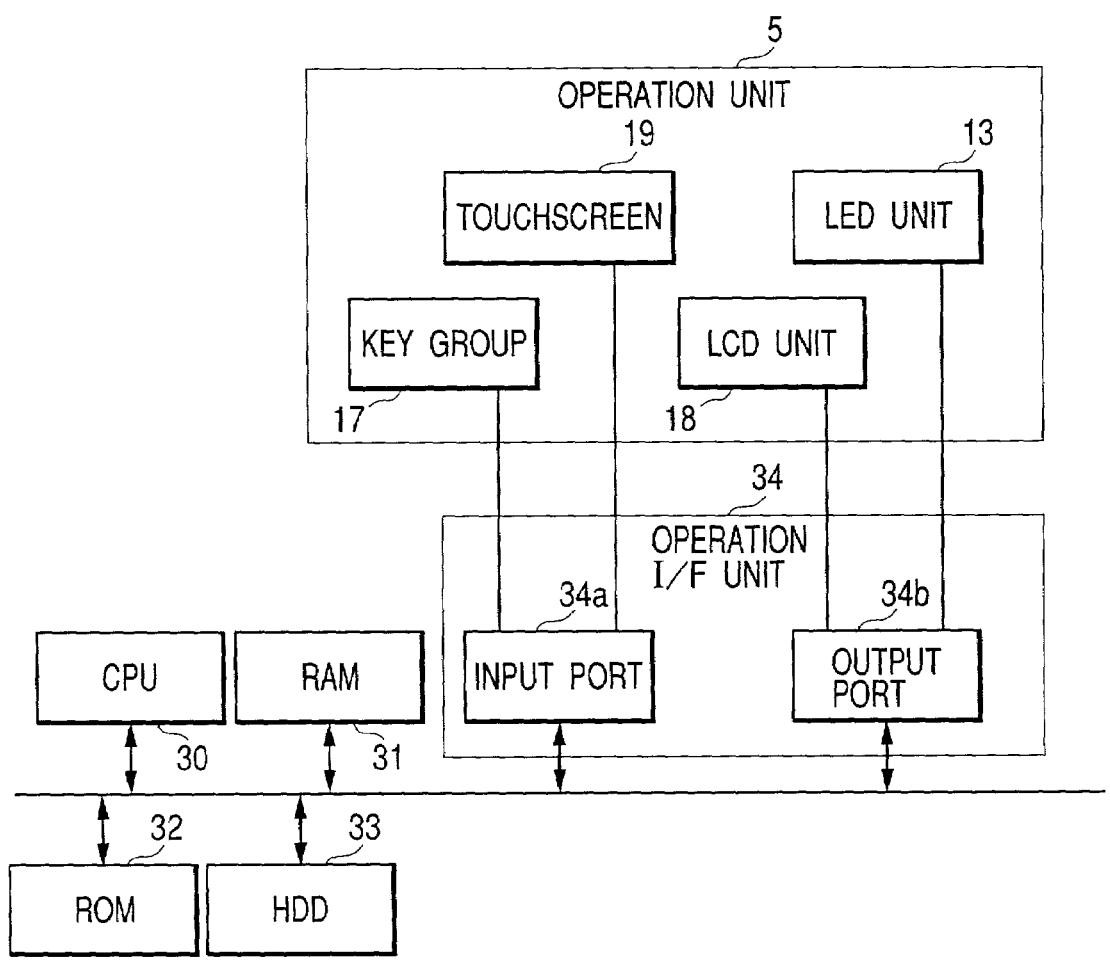
FIG. 6 is a block diagram showing the relationship between the control unit and the operation unit.

FIG. 6 is a block diagram indicating connecting relationship between the operation unit 5 and the operation I/F unit 34, which has an input port 34a and an output port 34b. The input port 34a is connected to the key group 17 of various keys and the touchscreen 19. The output port 34b is connected to the LCD unit 18 and the LED unit 13.

At the operation unit 5, the operation contents is obtained via the input port 34a of the operation I/F unit 34 upon receiving input information inputted by the user from the touchscreen 19 or the key group 17 of various keys, and the CPU 30 creates display screen data on the basis of the obtained operation contents and the control program stored in the ROM 32 to output it to the LCD unit 18 via the output port 34b of the operation I/F unit 34.

At the operation unit 5, display on the LCD unit 18 is switched by performing an operation on a display screen such as depression of the touchscreen 19 or the like, and an output destination device for the prints is designated, a sheet selection screen corresponding to the output destination is displayed and desired sheet size is inputted.

Figure 7:
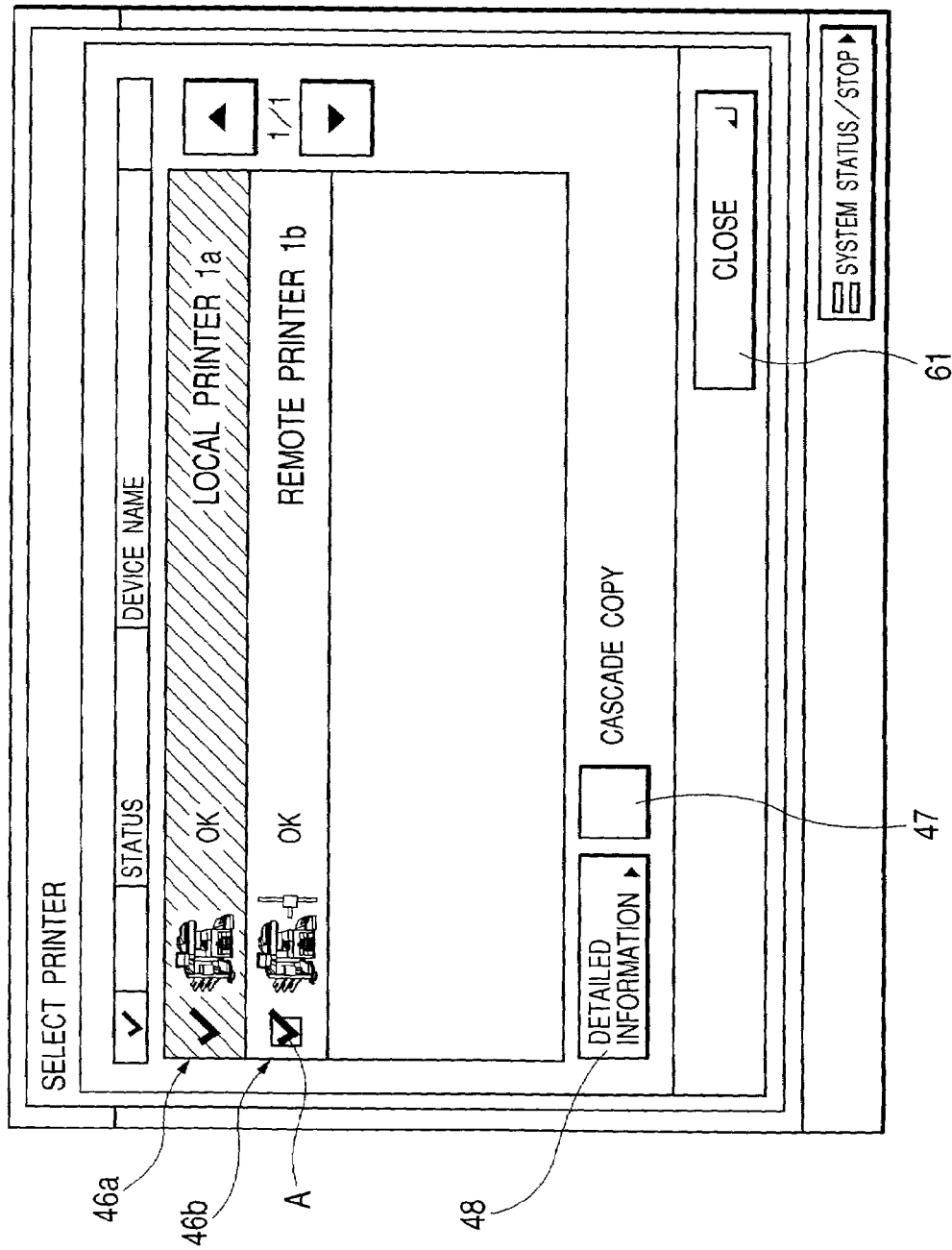
FIG. 7 is a diagram showing a printer selection window.

FIG. 7 is a diagram indicating a printer selection window which is displayed in case of depressing the output device selection key 28 on the initial screen (FIG. 4). The output destination for the cascade copy is set by operating the printer selection window.

That is, when the output device selection key 28 is depressed, the display screen is switched to the printer selection window as shown in FIG. 7. The printer selection window has plural display areas for output devices ready to output (in the embodiment, display areas 46a and 46b for first and second output devices ready to output), and each of the output devices ready to output is displayed in each of the display areas 46a and 46b. Accordingly, the output devices ready to output are displayed as a list. In the embodiment, the local printer 1a being the own apparatus and the remote printer 1b connected to the LAN 2 are respectively displayed in the display areas 46a and 46b.

In a state that the output device selection key 28 is depressed on the initial screen, an output mode is set to the local copy mode, and the local printer 1a is reversely displayed in the display area 46a (in FIG. 7, indicated by oblique lines) for the first output device ready to output, and an icon indicating the remote printer 1b, status thereof and a device name are displayed. In this state, when a cascade copy key 47 is depressed, a check mark is given to a portion of the remote printer 1b (in FIG. 7 indicated by "A"). Accordingly, the output device on the LAN 2 for performing the cascade copy is specified.

In the embodiment, a case that the local printer 1a being the own apparatus and the remote printer 1b are connected on the LAN 2 is indicated on the printer selection window. However, in a case where two or more than remote printers are connected on the LAN 2, all the remote printers are displayed on the printer selection window as a list. In this case, by successively depressing the cascade copy key 47, the check mark is given to each of the remote printers, and setting of the cascade copy can be released for a specified remote printer by depressing the cascade copy key 47 predetermined times.

When a close key 61 is depressed, the printer selection window is closed. In a case where the output mode is set to the cascade copy mode as described above, the display screen is switched to a cascade standard screen shown in FIG. 8. That is, in the cascade standard screen, a cascade icon 51 for indicating setting of the cascade copy and a character string 52 indicating cascade copy setting are displayed at the output destination display part 29.

Detailed information of the remote printer 1b can be confirmed by depressing a detailed information key 48.

Figure 9:
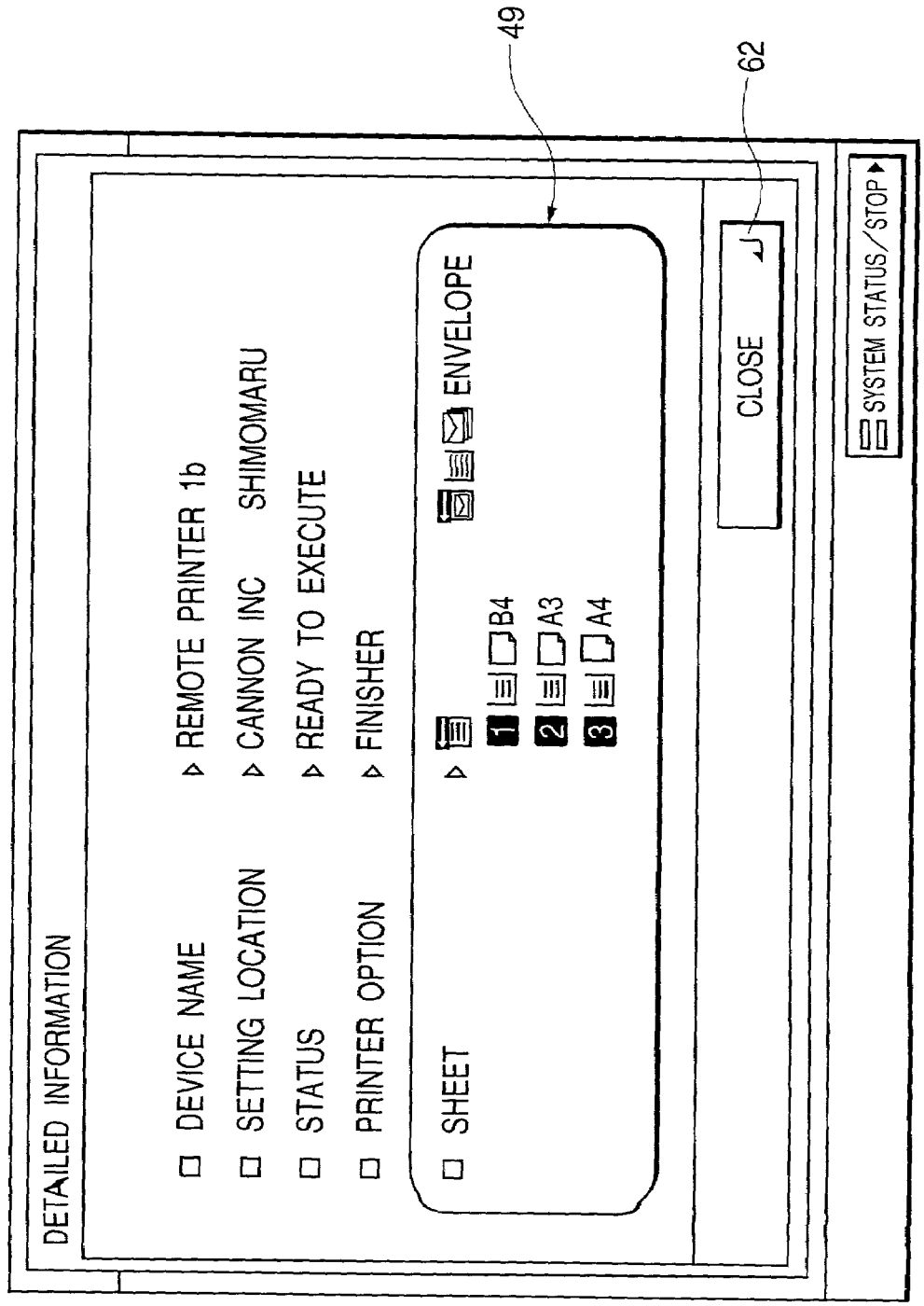
FIG. 9 is a diagram showing a detailed information display window.

FIG. 9 is a diagram indicating a detailed information setting window displayed by depressing the detailed information key 48. In a sheet selection area 49, recording sheet size is displayed. When the cascade copy is performed, recording sheet information, to which the check mark is given, is obtained in the sheet selection area 49 through the LAN 2, and setting of the output sheets used in the cascade copy is performed.

When a close key 62 is depressed, the detailed information setting window is closed and the display screen is switched to the printer selection window (FIG. 7).

Figure 10:
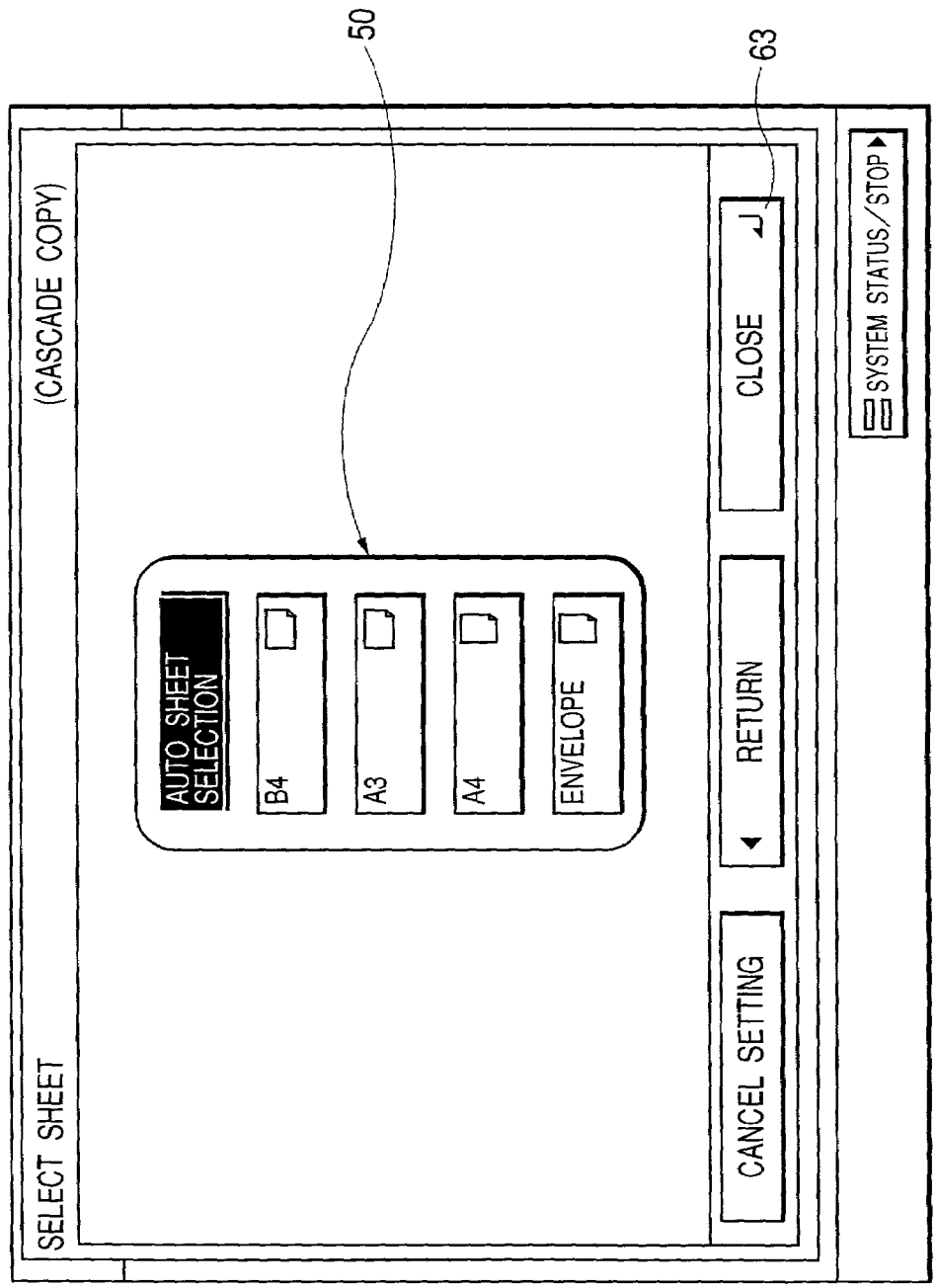
FIG. 10 is a diagram showing a sheet selection window.

When the sheet selection key 22 is depressed in the cascade standard screen (FIG. 8), the display screen is switched to a sheet selection window shown in FIG. 10, where a recording sheet, on which an image is outputted from each of the output devices, is selected. That is, the sheet selection window has an output sheet size display area 50, where common recording sheet size capable of being outputted by the local printer 1a and the selected remote printer 1b is displayed. In the embodiment, an APS mode is selected. Accordingly, the output sheet is automatically selected among sheet sizes (in the embodiment, B4 size, A3 size, A4 size and envelope) displayed in the output sheet size display area 50, and image data is outputted on the selected output sheet.

In the APS mode of the embodiment, an original size detection sensor provided at the scanner unit 3a detects original size, and image size is determined according to the detected original size and a copying magnification. In accordance with the determined image size, the output sheet is automatically selected among the sheet sizes displayed in the output sheet size display area 50.

In a case where the APS mode is not set, the user optionally selects the output sheet size displayed in the output sheet size display area 50, and the image data is outputted on the selected output sheet.

As above, the image data can be outputted on the same sized output sheets at the local printer 1a and the remote printer 1b.

Figure 8:
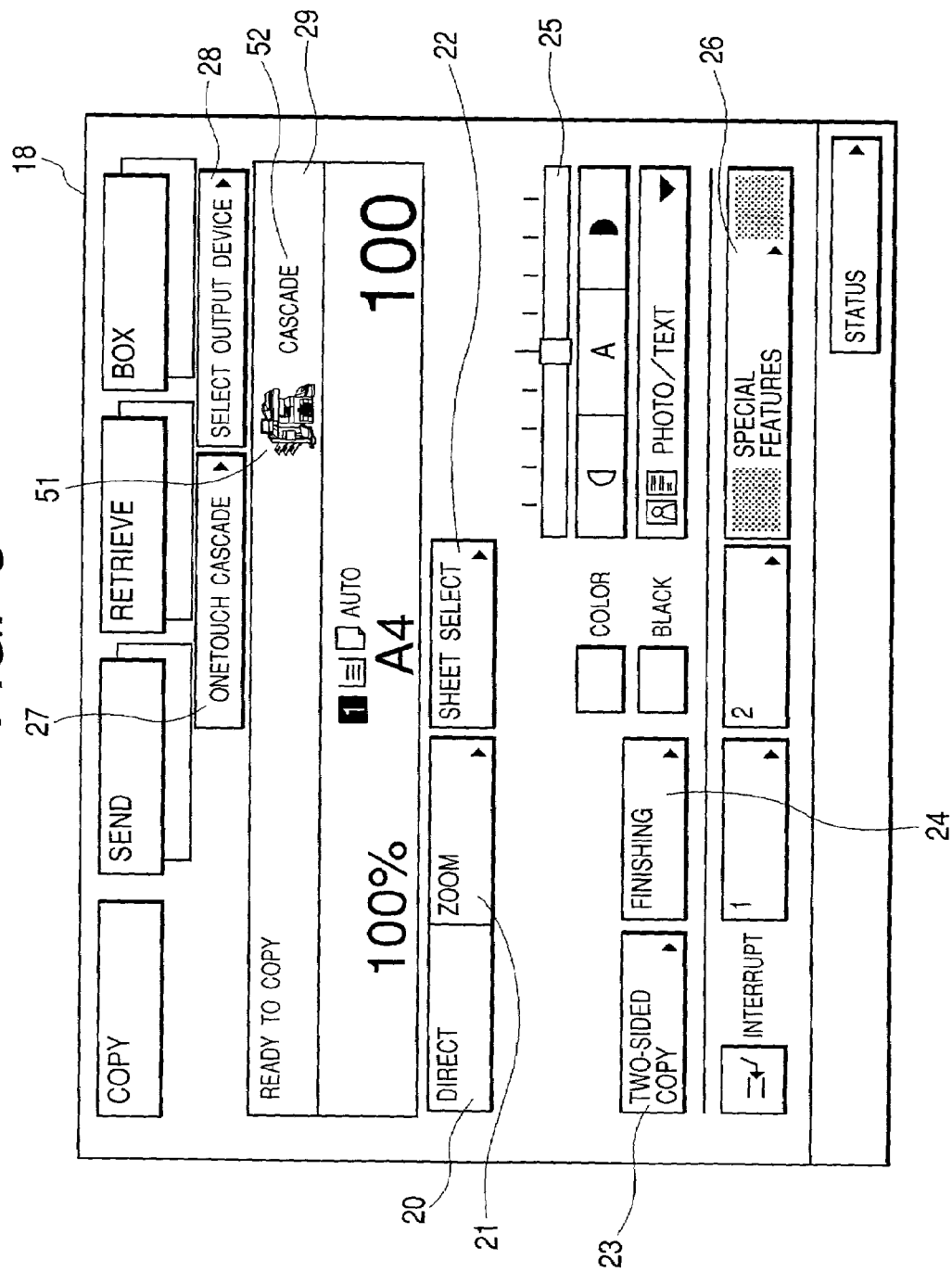
FIG. 8 is a diagram showing a window indicating a cascade standard screen.

By depressing a close key 63, the sheet selection window is closed and the display screen is switched to the cascade standard screen (FIG. 8).

Figure 11:
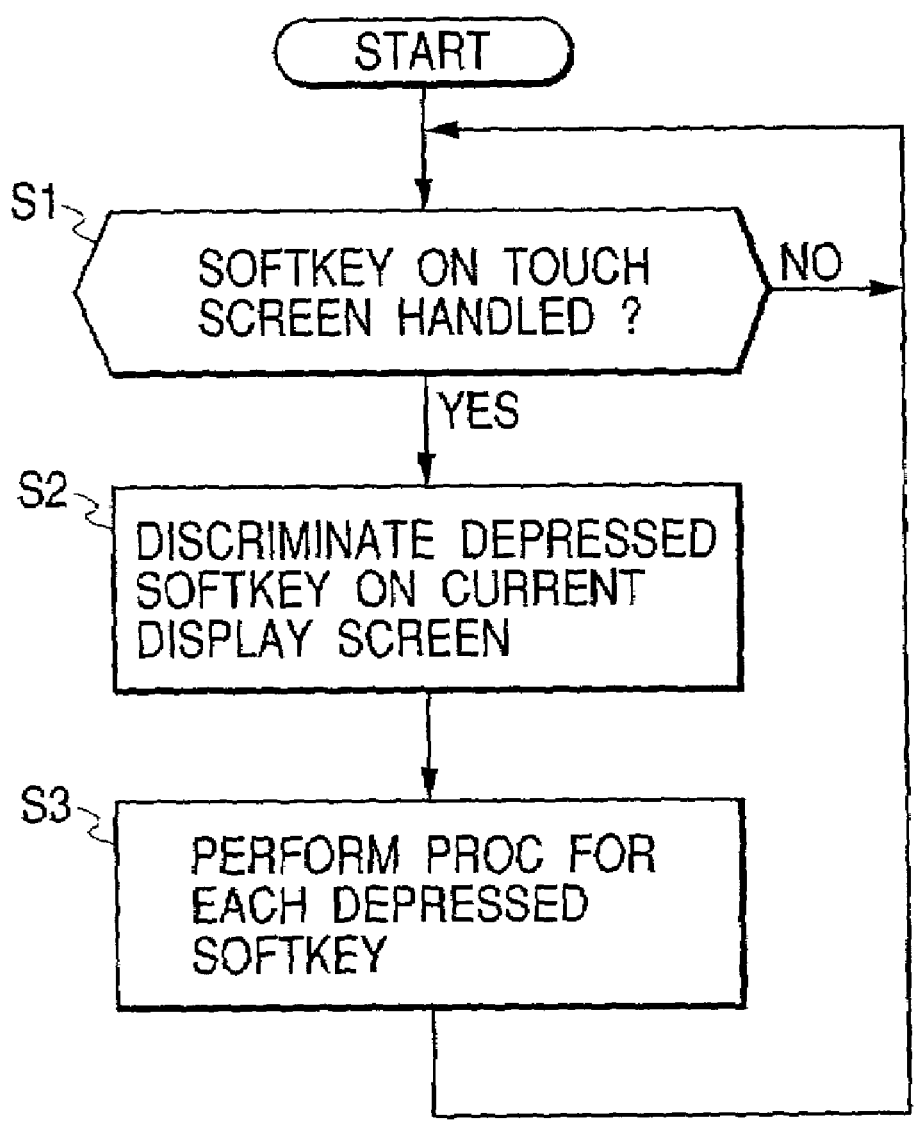
FIG. 11 is a flow chart indicating an operation procedure of softkeys on the LCD unit.

FIG. 11 is a flow chart indicating an operating procedure of the softkeys displayed on the LCD unit 18. The program of this processing procedure stored in the ROM 32 is executed by the CPU 30.

In a step S1, it is judged whether or not any of the softkeys on the touchscreen 19 is depressed. When the key is not depressed, wait for the depression of the key. While, when any of the softkeys is depressed, the flow advances to a step S2, where the depressed softkey is discriminated on the basis of the current display screen. In a subsequent step S3, predetermined processing corresponding to the depressed softkey is executed, then the flow returns to the step S1. That is, in accordance with the depressed softkey, for example, bit-map data stored in the ROM 32 is transferred to the LCD unit 18 to display it, or setting contents is stored in the RAM 31, thereafter the flow returns to the step S1.

In case of performing the cascade copy, setting processing of the cascade copy or setting processing of the output sheet is executed by depressing the output device selection key 28 or the sheet selection key 22, then a copying operation is performed.

Figure 12:
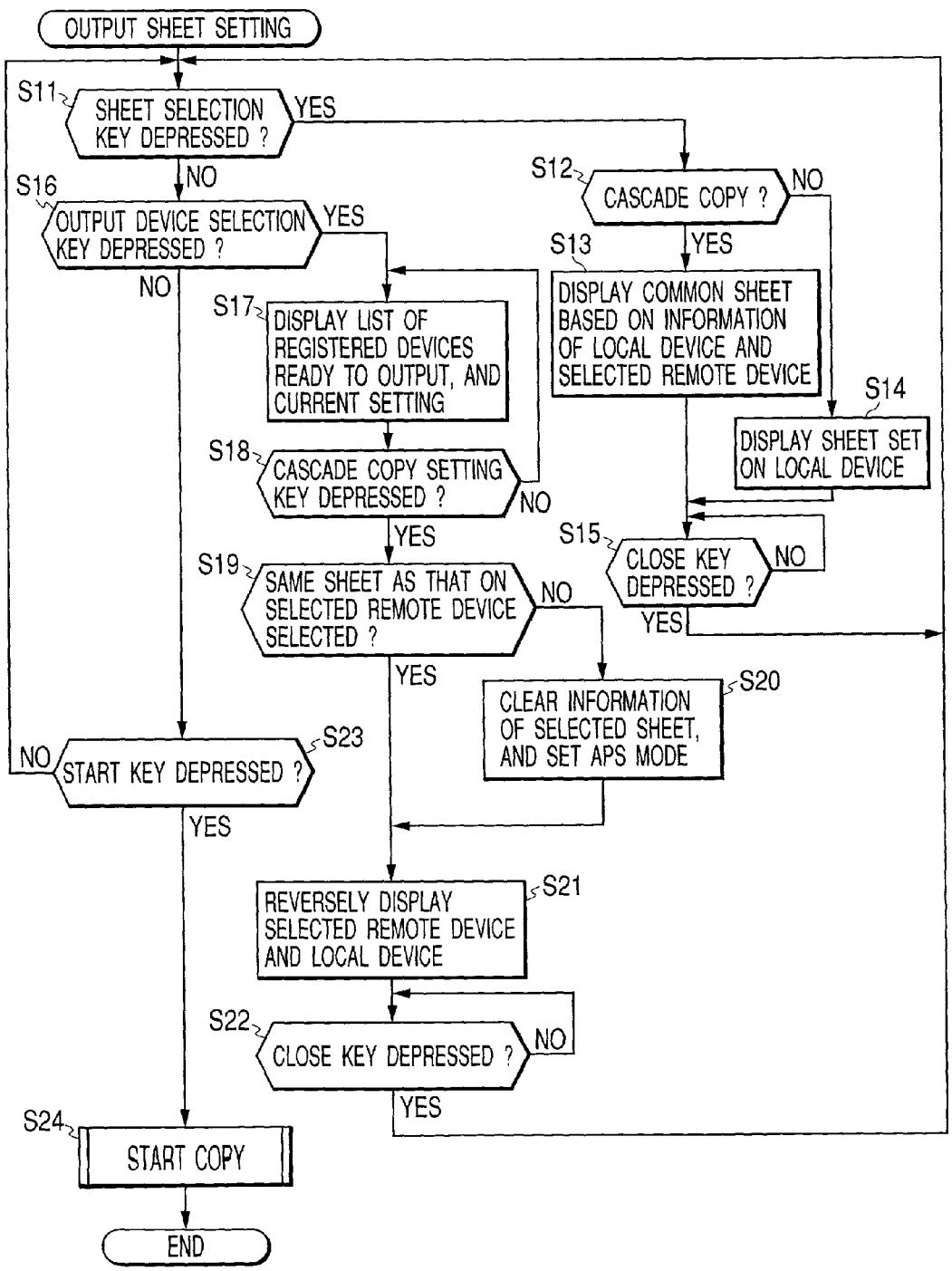
FIG. 12 is a flow chart indicating a recording sheet setting procedure performed in a local printer.

FIG. 12 is a flow chart indicating an output sheet setting procedure in case of performing the cascade copy. The program of this processing procedure stored in the ROM 32 of the local printer 1a is executed by the CPU 30.

At first, in a step S11, it is judged whether or not the sheet selection key 22 is depressed. When the sheet selection key 22 is depressed, the display screen is switched to the sheet selection window (FIG. 10). Then, in a step S12, it is judged whether or not the cascade copy mode is set.

In the step S12, when it is judged that the cascade copy mode is set, for example, if the remote printer 1b was already selected as a printer for the cascade copy, common recording sheet size which can be outputted by the local printer 1a and the remote printer 1b is displayed on the sheet selection window in a step S13. Then, the flow advances to a step S15.

On the other hand, in the step S12, when it is judged that the cascade copy mode is not set, that is, in a case where the local copy mode is set, the flow advances to a step S14, where the sheet size set in the local printer 1a is displayed on the sheet selection window. Then, the flow advances to the step S15.

In the step S15, wait for the depression of the close key 63 on the sheet selection window, and the flow returns to the step S11 upon depressing the close key 63.

On the other hand, when the sheet selection key 22 is not depressed in the step S11, the flow advances to a step S16, where it is judged whether or not the output device selection key 28 is depressed.

When it is judged that the output device selection key 28 is depressed, the display screen is switched to the printer selection window in a step S17, where the registered printers ready to output are displayed as a list. At this time, a check mark is given to the output device (for example, the local printer 1a), to which an outputting operation is to be currently performed.

In a subsequent step S18, it is judged whether or not the cascade copy key 47 is depressed. When it is judged that the cascade copy key 47 is not depressed, the flow returns to the step S17. On the other hand, when it is judged that the cascade copy key 47 is depressed in the step S18, a check mark is given to the remote printer 1b to which the cascade copy is to be performed, and the display screen is switched to the cascade standard screen (FIG. 8) by depressing the close key 61. Then, the flow advances to a step S19.

In the step S19, it is judged whether or not sheet size which is same as that of the recording sheet set on the remote printer 1b is selected, and the judged result is displayed at the output destination display part 29 in the cascade standard screen.

When it is judged that the same sheet size is selected (in case of Yes), the flow immediately advances to a step S21.

On the other hand, when it is judged that the same sheet size is not selected (in case of No), the flow advances to a step S20, where sheet size information of the selected recording sheet is cleared, and the APS mode for automatically determining the sheet size is set among modes which can be set by depressing the special features mode setting key 26 or the zoom key 21, then the flow advances to the step S21. That is, in a case where the output sheet at the local printer 1a is different from the output sheet at the remote printer 1b, since an output image under the same output condition can not be obtained, the sheet size information being selected at the local printer 1a is cleared, and the APS mode is set such that the recording sheet which also can be outputted at the remote printer 1b is to be selected.

Subsequently, in the step S21, the remote printer 1b and the local printer 1a selected on the printer selection window are reversely displayed. In a step S22, wait for the depression of the close key 61, and when the close key 61 is depressed, the flow returns to the step S11.

After then, when NO in the step S16, the flow advances to a step S23, where wait for the depression of the start key 12 in the operation unit 5 (see FIG. 3). When the start key 12 is not depressed, the flow returns to the step S11. On the other hand, when the start key 12 is depressed, a copying operation is started in the step S23, and processing is terminated.

As above, the recording sheets which can be outputted with the same size can be automatically selected without checking detailed information of the remote printer 1b when the cascade copy mode is set, thereby improving operability.

Next, the explanation will be given for a case of setting the output condition at the remote printer 1b side such that the output condition is coincided with setting set in the local printer 1a.

Figure 13:
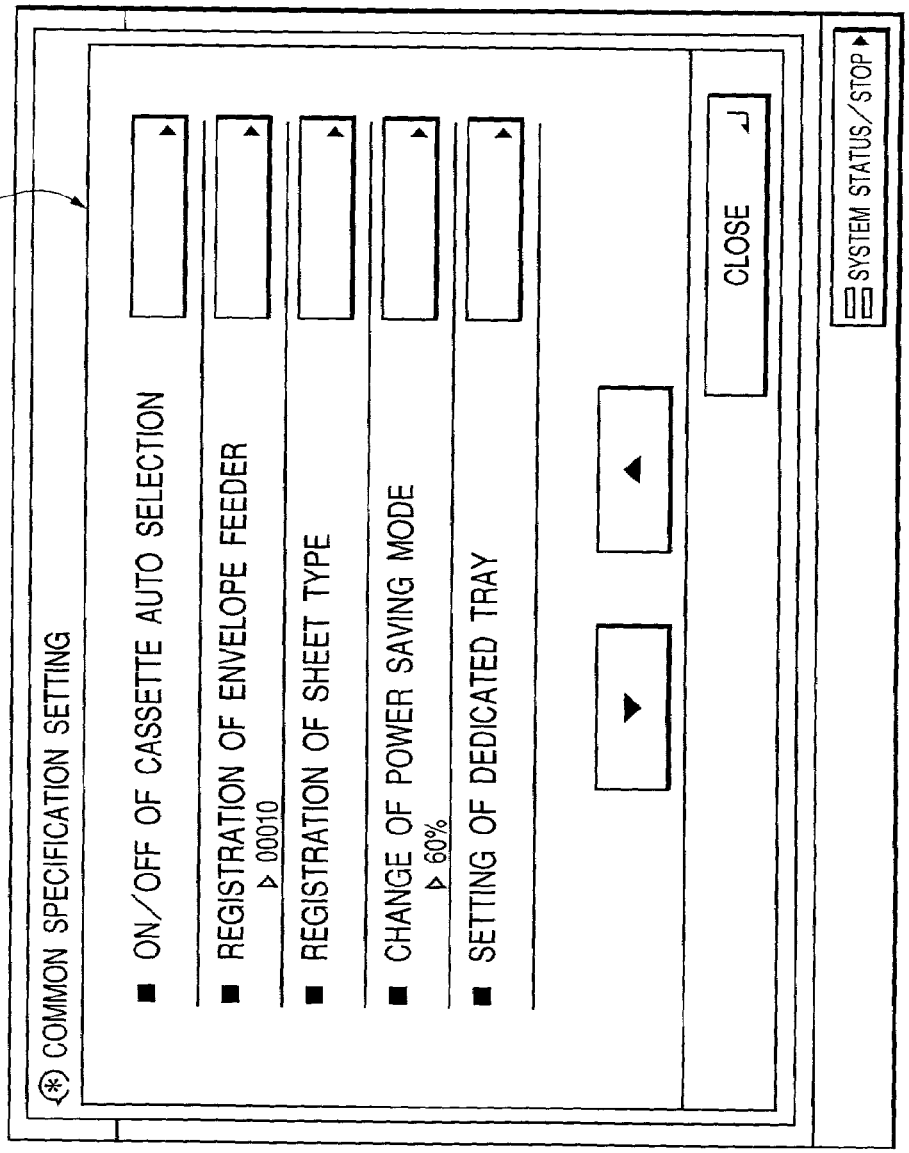
FIG. 13 is a diagram showing a common specification setting window.

FIG. 13 is a diagram showing a display screen of a common specification setting window for customizing output control of the remote printer 1b.

Figure 14:
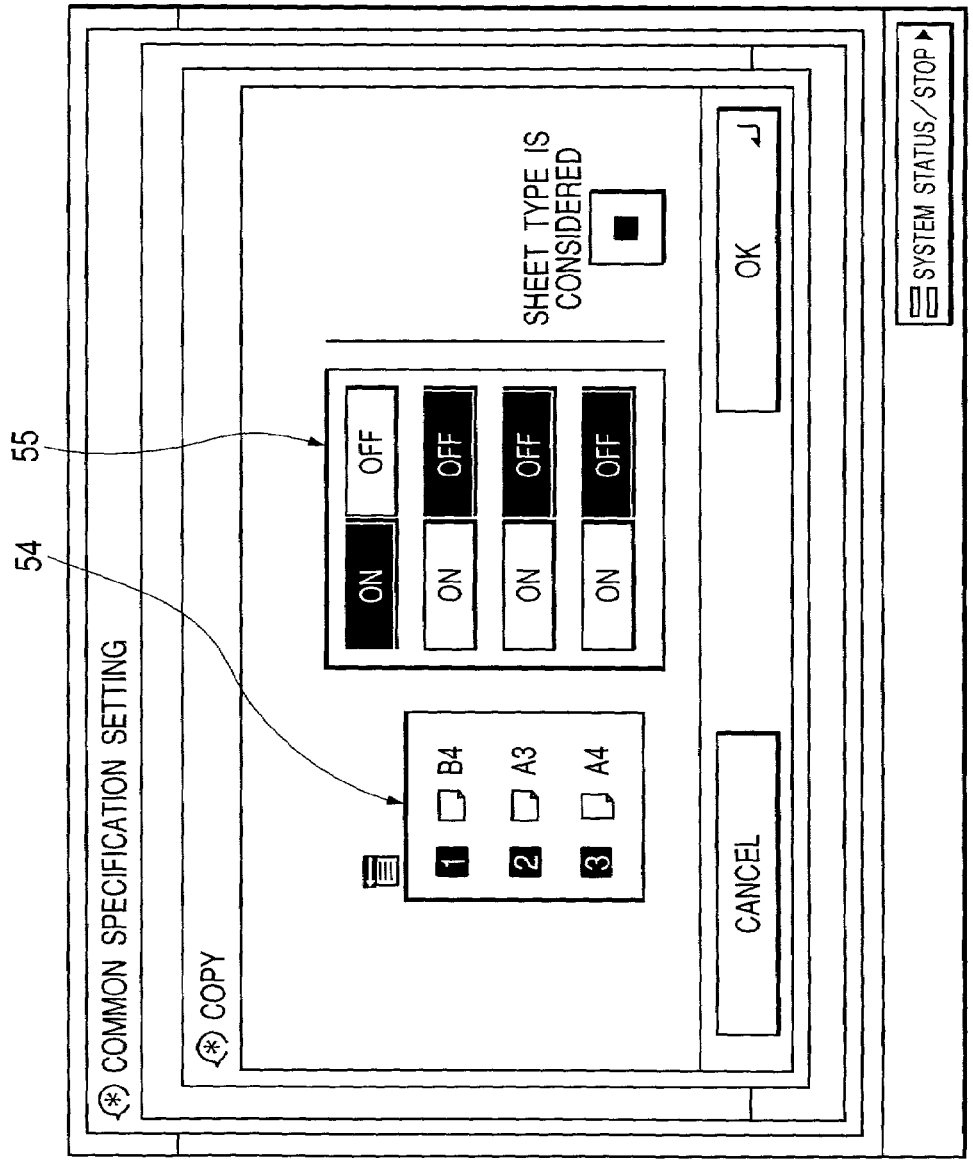
FIG. 14 is a diagram showing an automatic sheet selection setting window.
Figure 15:
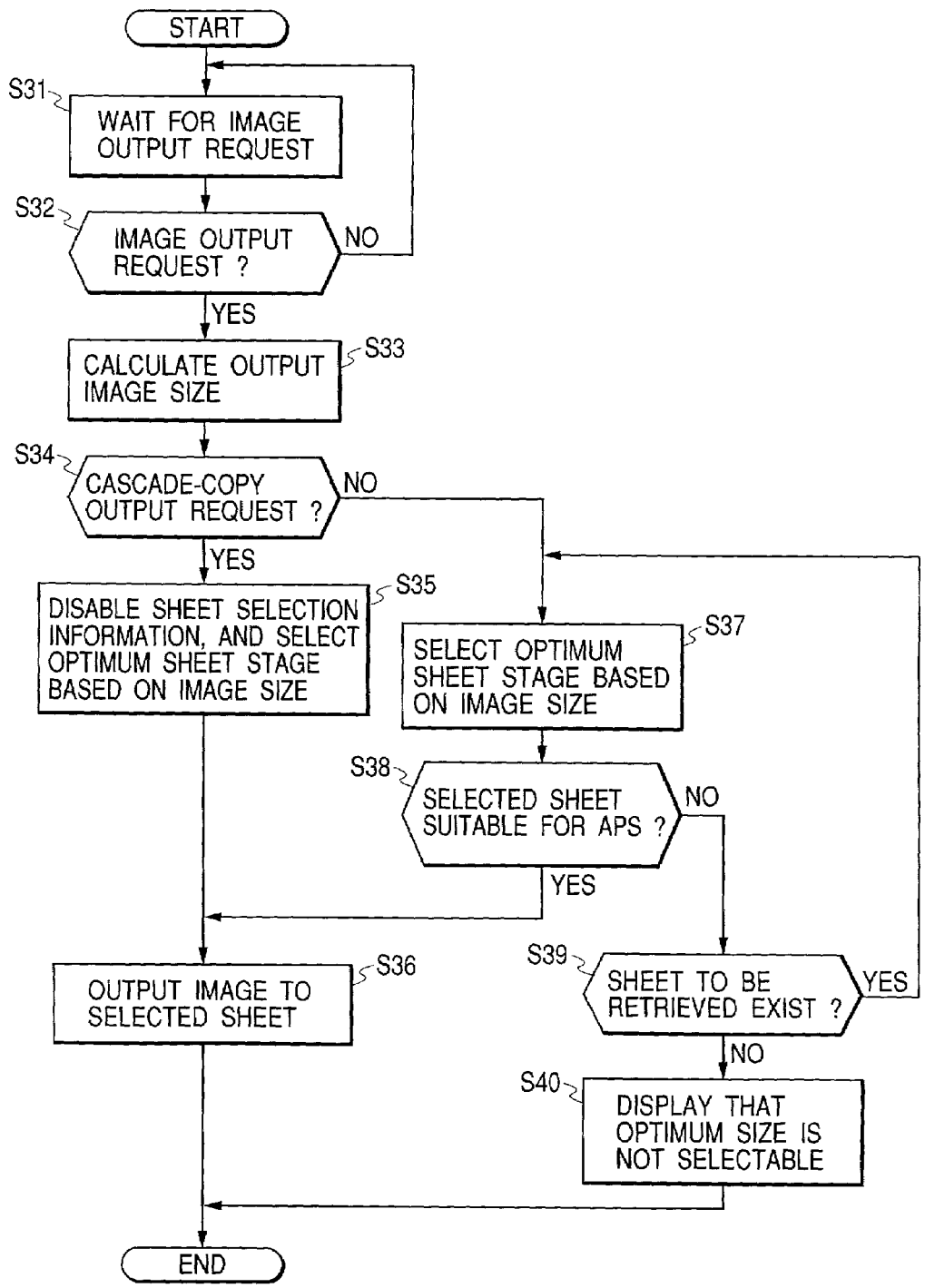
FIG. 15 is a flow chart indicating a recording sheet setting procedure performed in a remote printer.

On the common specification setting window, when a cassette automatic selection key 53 is depressed, an APS setting window shown in FIG. 14 is displayed. The APS setting window has a sheet size display area 54 used for displaying size of the recording sheets held by the remote printer 1b and an on/off key display area 55 for setting whether or not the APS operation is performed to each of the recording sheets displayed in the sheet size display area 54. By selecting an off-state using each of on/off keys displayed in the on/off key display area 55, the recording sheets set in the off-state can not be used in case of performing the copying operation at the remote printer 1b side. However, in the cascade copy mode, setting set in the local printer 1a is required to be effective. Accordingly, the output condition is controlled at the remote printer 1b side according to a flow chart shown in FIG. 15. The program of this processing procedure stored in the ROM 32 of the remote printer 1b is executed by the CPU 30.

In a step S31, when the remote printer 1b is in a state of waiting for an image output request, the flow advances to a step S32, where it is judged whether or not the image output request is issued. When the image output request is issued, the flow advances to a step S33, where image size is calculated on the basis of image information to be outputted. In the embodiment, the image size is calculated from image data transferred together with the image output request.

In a subsequent step S34, it is judged whether or not a cascade copy output request is issued. When it is judged that the cascade copy output request is instructed, the output condition at the local printer 1a is required to be effective. Accordingly, sheet selection information selected in the APS setting window shown in FIG. 14 is temporarily disabled, and a sheet feed cassette which corresponds to the same output condition as that of the local printer 1a is selected on the basis of the image size calculated in the step S33.

Then, the flow advances to a step S36, where the recording sheet is fed from the sheet feed cassette selected in a step S35 to output the image data on that recording sheet.

On the other hand, when the cascade copy output request is not instructed in the step S34, the flow advances to a step S37, where an optimum sheet feed cassette is selected on the basis of the image size calculated in the step S33.

In a subsequent step S38, it is judged whether or not the recording sheets stored in the selected sheet feed cassette are suitable for the APS operation. When YES in the step S38, the flow advances to the step S36, where the image data is outputted on the selected recording sheet.

On the other hand, when NO in the step S38, it is judged in a step S39 whether or not the recording sheet to be retrieved exists. Then, when YES in the step S39, the flow returns to the step S37, where that recording sheet is retrieved again, wherein when NO in the step S39, the flow advances to a step S40. In the step S40, a fact that the optimum sized recording sheet can not be selected is displayed on the LCD unit 18 in the operation unit 5, then processing is terminated.

As above, in the embodiment, the remote printer 1b which received the cascade copy request temporarily disables setting of the sheet information and makes the output condition coincide with that of the local printer 1a such that the output sheet coincides with that selected at the local printer 1a side. Therefore, the remote printer 1b can easily obtain the same image output result as that of the local printer 1a without stopping the copying operation.

It is needless to say that the present invention is completed in a case where a storage medium storing the program codes of software for realizing the functions of the embodiment is supplied to a system or an apparatus and then a computer (or CPU or MPU) in the system or the apparatus reads and executes the program codes stored in the storage medium (e.g., the RAM 31 in the embodiment).

In this case, the program codes themselves read from the storage medium realize the functions of the embodiment, and the storage medium storing such the program codes constitute the present invention. The storage medium for supplying the program codes can be, for example, a floppy disk, a hard disk, an optical disk, a magnetooptical disk, a CD-ROM, a CD-R, a magnetic tape, a non-volatile memory card, a ROM, or the like. It is needless to say that the present invention also includes not only a case where the functions of the above embodiment are realized by the execution of the program codes read by the computer, but also a case where an OS or the like functioning on the computer executes all the process or a part thereof according to the instructions of the program codes, thereby realizing the functions of the above embodiment.

Further, it is needless to say that the present invention includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of the program codes, thereby realizing the functions of the above embodiment.

As above, the present invention has been explained on the basis of the preferable embodiment. However, the present invention is not limited to the above embodiment, but may be modified in various manners within the scope of the following claims.

What is claimed is:

1. An image input/output apparatus capable of communicating with another image input/output apparatus through a communication medium for outputting inputted image data, comprising:
   setting means for performing setting related to sheet size selection;
   calculation means for calculating data size of the inputted image data; and
   sheet selection means for selecting output sheet size on the basis of a calculation result obtained by said calculation means and the setting set by said setting means,
   wherein in a case where an image output request of outputting image data inputted by the another image input/output apparatus using the another image input/output apparatus and the own image input/output apparatus is received, the setting set by said setting means is disabled, and said calculation means calculates the data size of the image data transferred from the another image input/output apparatus and said sheet selection means selects the output sheet size on the basis of the calculation result obtained by said calculation means.

2. An apparatus according to claim 1, further comprising:
   output control means for controlling to output the transferred image data on a sheet of which size corresponds to the output sheet size selected by said sheet selection means.

3. An apparatus according to claim 2, wherein said output control means controls to feed an output sheet of which size is selected by said sheet selection means from a sheet feed stage storing recording sheets and controls a printer unit to output the transferred image data on the output sheet.

4. An apparatus according to claim 3, wherein said setting means sets whether or not size of the recording sheets stored in the sheet feed stage can be selected by said sheet selection means.

5. An apparatus according to claim 1, wherein the another image input/output apparatus has a scanner unit for inputting image data by reading originals, and the transferred image data is the image data inputted by the scanner unit.

6. An image input/output apparatus capable of communicating with another image input/output apparatus through a communication medium for outputting inputted image data, comprising:
   image input means for inputting image data;
   display means for displaying sheet information of recording sheets commonly held by the another image input/output apparatus and the own image input/output apparatus for outputting the image data inputted by said image input means;
   sheet selection means for selecting output sheet size used in outputting the image data on the basis of the sheet information displayed by said display means;
   output control means for controlling the own image input/output apparatus and the another image input/output apparatus to output the image data on sheets of which size corresponds to the output sheet size selected by said sheet selection means,
   wherein control information to be transmitted to the another image input/output apparatus by said output control means includes information used in disabling selection setting of recording sheet size according to the another image input/output apparatus.

7. An apparatus according to claim 6, wherein the control information to be transmitted by said output control means includes an image output request to be issued by the own image input/output apparatus and the another image input/output apparatus, and the another image input/output apparatus disables the selection setting of the own recording sheet size in a case where the image output request is received.

8. An apparatus according to claim 6, wherein said image input means is a scanner unit, and the scanner unit inputs the image data by reading originals.

9. An apparatus according to claim 6, wherein said output control means controls to feed an output sheet of which size is selected by said sheet selection means from a sheet feed stage storing recording sheets and controls a printer unit to output the image data on the output sheet.

10. An apparatus according to claim 6, wherein said sheet selection means selects the output sheet size used in outputting the image data on the basis of the sheet information displayed by said display means and data size of the image data.

11. An image input/output apparatus capable of communicating with another image input/output apparatus through a communication medium for outputting inputted image data, comprising:

image input means for inputting image data;

device selection means for selecting the another image input/output apparatus for outputting the image data inputted by said image input means;

judgment means for judging whether or not recording sheet size set in the another image input/output apparatus selected by said device selection means is coincided with recording sheet size being selected by the own image input/output apparatus; and setting means for disabling the recording sheet size being selected by the own image input/output apparatus in a case where it is detected that the two recording sheet sizes are not coincided with each other by said judgment means and performing setting related to sheet size selection so as to select output sheet size on the basis of data size of the image data inputted by said image input means.

12. An apparatus according to claim 11, further comprising:

output control means for controlling the own image input/output apparatus and the another image input/output apparatus to output the image data on sheets of which size corresponds to the output sheet size selected on the basis of the setting set by said setting means.

13. An apparatus according to claim 12, wherein said output control means controls to feed an output sheet of which size is selected on the basis of the setting from a sheet feed stage storing recording sheets and controls a printer unit to output the image data inputted by said image input means on the output sheet.

14. An apparatus according to claim 12, wherein control information to be transmitted by said output control means includes an image output request to be issued by the own image input/output apparatus and the another image input/output apparatus, and the another image input/output apparatus disables selection setting of the own recording sheet size in a case where the image output request is received.

15. An apparatus according to claim 11, wherein said image input means is a scanner unit, and the scanner unit inputs the image data by reading originals.

16. An image input/output apparatus capable of communicating with another image input/output apparatus through a communication medium for outputting inputted image data, comprising:

judgment means for judging whether or not an image output request using the another image input/output apparatus and the own image input/output apparatus is received from the another image input/output apparatus; and output control means for controlling an output condition of image data transferred from the another image input/output apparatus, wherein said output control means disables sheet selection setting according to the own image input/output apparatus in case of judging that the image output request is received by said judgment means.

17. An image input/output apparatus capable of communicating with another image input/output apparatus through a communication medium for outputting inputted image data, comprising:

image input means for inputting image data;

display means for displaying sheet information of recording sheets commonly held by the another image input/output apparatus and the own image input/output apparatus for outputting the image data inputted by said image input means;

sheet selection means for selecting output sheet size used in outputting the image data on the basis of the sheet information displayed by said display means; and output control means for controlling the own image input/output apparatus and the another image input/output apparatus to output the image data on sheets of which size corresponds to the output sheet size selected by said sheet selection means.

18. An image input/output apparatus capable of communicating with another image input/output apparatus through a communication medium for outputting inputted image data, comprising:

judgment means for judging whether or not recording sheet size set in the another image input/output apparatus is coincided with recording sheet size being selected by the own image input/output apparatus in case of outputting the image data inputted by the own image input/output apparatus and the another image input/output apparatus; and sheet selection means for disabling the recording sheet size being selected by the own image input/output apparatus in a case where it is detected that the two recording sheet sizes are not coincided with each other by said judgment means and selecting output sheet size on the basis of data size of the inputted image data.

19. A remote image input/output apparatus, which has a second scanner unit for reading image data of originals and a second printer unit for feeding output sheets from a sheet feed stage storing recording sheets and printing the image data on the output sheets, capable of communicating with a local image input/output apparatus which has a first scanner unit and a first printer unit through a predetermined network, comprising:

setting means for setting recording sheet size to be selected in output sheet size selection based on size of input image data;

calculation means for calculating data size of the input image data;

sheet selection means for selecting output sheet size used in printing the input image data by the second printer unit among recording sheet sizes set to be selected by said setting means on the basis of a calculation result obtained by said calculation means; and judgment means for judging whether or not a cascade copy request for image data read by the first scanner unit using the first printer unit and the second printer unit is received from the local image input/output apparatus, wherein the setting set by said setting means is disabled in case of judging that the cascade copy request is received by said judgment means, and said calculation means calculates data size of image data transferred from the local image input/output apparatus, said sheet selection means selects the output sheet size on the basis of the calculation result obtained by said calculation means, and the second printer unit prints the transferred image data on a sheet of which size corresponds to the output sheet size selected by said sheet selection means.

20. A local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:

display means for displaying sheet information of recording sheets commonly held by the remote image input/output apparatus and the own image input/output apparatus for printing the image data read by the first scanner unit;

sheet selection means for selecting print sheet size used in printing the image data on the basis of the sheet information displayed by said display means; and print control means for controlling the own image input/output apparatus and the remote image input/output apparatus to print the image data on sheets of which size corresponds to the output sheet size selected by said sheet selection means, wherein control information transmitted to the remote image input/output apparatus by said print control means includes information used in disabling selection information of recording sheet size previously set by the remote image input/output apparatus.

21. A local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:

device selection means for selecting the remote image input/output apparatus for printing the image data read by the first scanner unit;

judgment means for judging whether or not recording sheet size set in the remote image input/output apparatus selected by said device selection means is coincided with recording sheet size being selected by the own image input/output apparatus; and setting means for disabling the recording sheet size being selected by the own image input/output apparatus in a case where it is detected that the two recording sheet sizes are not coincided with each other by said judgment means and performing setting related to sheet size selection so as to select output sheet size on the basis of data size of the image data to be read by the first scanner unit.

22. An image output method of an image input/output apparatus capable of communicating with another image input/output apparatus through a communication medium for outputting inputted image data, comprising:

a setting step of performing setting related to sheet size selection;

a calculation step of calculating data size of the inputted image data; and a sheet selection step of selecting output sheet size on the basis of a calculation result obtained by said calculation step and the setting set by said setting step, wherein in a case where an image output request of outputting image data inputted by the another image input/output apparatus using the another image input/output apparatus and the own image input/output apparatus is received, the setting set by said setting step is disabled, and said calculation step calculates the data size of the image data transferred from the another image input/output apparatus and said sheet selection step selects the output sheet size on the basis of the calculation result obtained by said calculation step.

23. A method according to claim 22, further comprising:
an output control step of controlling to output the transferred image data on a sheet of which size corresponds to the output sheet size selected by said sheet selection step.

24. A method according to claim 23, wherein said output control step controls to feed an output sheet of which size is selected by said sheet selection step from a sheet feed stage storing recording sheets and controls a printer unit to output the transferred image data on the output sheet.

25. A method according to claim 24, wherein said setting step sets whether or not size of the recording sheets stored in the sheet feed stage can be selected by said sheet selection step.

26. A method according to claim 22, wherein the another image input/output apparatus has a scanner unit for inputting image data by reading originals, and the transferred image data is the image data inputted by the scanner unit.

27. An image output method of an image input/output apparatus capable of communicating with another image input/output apparatus through a communication medium for outputting inputted image data, comprising:

an image input step of inputting image data;

a display step of displaying sheet information of recording sheets commonly held by the another image input/output apparatus and the own image input/output apparatus for outputting the image data inputted by said image input step on a display;

a sheet selection step of selecting output sheet size used in outputting the image data on the basis of the sheet information displayed by said display step;

an output control step of controlling the own image input/output apparatus and the another image input/output apparatus to output the image data on sheets of which size corresponds to the output sheet size selected by said sheet selection step, wherein control information to be transmitted to the another image input/output apparatus by said output control step includes information used in disabling selection setting of recording sheet size according to the another image input/output apparatus.

28. A method according to claim 27, wherein the control information to be transmitted by said output control step includes an image output request to be issued by the own image input/output apparatus and the another image input/output apparatus, and the another image input/output apparatus disables the selection setting of the own recording sheet size in a case where the image output request is received.

29. A method according to claim 27, wherein said image input step inputs the image data by reading originals using a scanner unit.

30. A method according to claim 27, wherein said output control step controls to feed an output sheet of which size is selected by said sheet selection step from a sheet feed stage storing recording sheets and controls a printer unit to output the image data on the output sheet.

31. A method according to claim 27, wherein said sheet selection step selects the output sheet size used in outputting the image data on the basis of the sheet information displayed by said display step and data size of the image data.

32. An image output method of an image input/output apparatus capable of communicating with another image input/output apparatus through a communication medium for outputting inputted image data, comprising:

an image input step of inputting image data;
a device selection step of selecting the another image input/output apparatus for outputting the image data inputted by said image input step;
a judgment step of judging whether or not recording sheet size set in the another image input/output apparatus selected by said device selection step is coincided with recording sheet size being selected by the own image input/output apparatus; and
a setting step of disabling the recording sheet size being selected by the own image input/output apparatus in a case where it is detected that the two recording sheet sizes are not coincided with each other by said judgment step and performing setting related to sheet size selection so as to select output sheet size on the basis of data size of the image data inputted by said image input step.

33. A method according to claim 32, further comprising:
an output control step of controlling the own image input/output apparatus and the another image input/output apparatus to output the image data on sheets of which size corresponds to the output sheet size selected on the basis of the setting set by said setting step.

34. A method according to claim 33, wherein said output control step controls to feed an output sheet of which size is selected on the basis of the setting from a sheet feed stage storing recording sheets and controls a printer unit to output the image data inputted by said image input step on the output sheet.

35. A method according to claim 33, wherein control information to be transmitted by said output control step includes an image output request to be issued by the own image input/output apparatus and the another image input/output apparatus, and the another image input/output apparatus disables selection setting of the own recording sheet size in a case where the image output request is received.

36. A method according to claim 33, wherein said image input step inputs the image data by reading originals using a scanner unit.

37. An image output method of an image input/output apparatus capable of communicating with another image input/output apparatus through a communication medium for outputting inputted image data, comprising:
a judgment step of judging whether or not an image output request using the another image input/output apparatus and the own image input/output apparatus is received from the another image input/output apparatus; and
an output control step of controlling an output condition of image data transferred from the another image input/output apparatus,
wherein said output control step disables sheet selection setting according to the own image input/output apparatus in case of judging that the image output request is received by said judgment step.

38. An image output method of an image input/output apparatus capable of communicating with another image input/output apparatus through a communication medium for outputting inputted image data, comprising:
an image input step of inputting image data;
a display step of displaying sheet information of recording sheets commonly held by the another image input/output apparatus and the own image input/output apparatus for outputting the image data inputted by said image input step on a display;
a sheet selection step of selecting output sheet size used in outputting the image data on the basis of the sheet information displayed by said display step; and
an output control step of controlling the own image input/output apparatus and the another image input/output apparatus to output the image data on sheets of which size corresponds to the output sheet size selected by said sheet selection step.

39. An image output method of an image input/output apparatus capable of communicating with another image input/output apparatus through a communication medium for outputting inputted image data, comprising:
a judgment step of judging whether or not recording sheet size set in the another image input/output apparatus is coincided with recording sheet size being selected by the own image input/output apparatus in case of outputting the image data inputted by the own image input/output apparatus and the another image input/output apparatus; and
a sheet selection step of disabling the recording sheet size being selected by the own image input/output apparatus in a case where it is detected that the two recording sheet sizes are not coincided with each other by said judgment step and selecting output sheet size on the basis of data size of the inputted image data.

40. An output control method of a remote image input/output apparatus, which has a second scanner unit for reading image data of originals and a second printer unit for feeding output sheets from a sheet feed stage storing recording sheets and printing the image data on the output sheets, capable of communicating with a local image input/output apparatus which has a first scanner unit and a first printer unit through a predetermined network, comprising:
a setting step of setting recording sheet size to be selected in output sheet size selection based on size of input image data;
a calculation step of calculating data size of the input image data;
a sheet selection step of selecting output sheet size used in printing the input image data by the second printer unit among recording sheet sizes set to be selected by said setting step on the basis of a calculation result obtained by said calculation step; and
a judgment step of judging whether or not a cascade copy request for image data read by the first scanner unit using the first printer unit and the second printer unit is received from the local image input/output apparatus,
wherein the setting set by said setting step is disabled in case of judging that the cascade copy request is received by said judgment step, and said calculation step calculates data size of image data transferred from the local image input/output apparatus, said sheet selection step selects the output sheet size on the basis of the calculation result obtained by said calculation step, and the second printer unit prints the transferred image data on a sheet of which size corresponds to the output sheet size selected by said sheet selection step.

41. An output control method of a local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:
a display step of displaying sheet information of recording sheets commonly held by the remote image input/output apparatus and the own image input/output apparatus for printing the image data read by the first scanner unit on a display;

a sheet selection step of selecting print sheet size used in printing the image data on the basis of the sheet information displayed by said display step; and a print control step of controlling the own image input/output apparatus and the remote image input/output apparatus to print the image data on sheets of which size corresponds to the output sheet size selected by said sheet selection step, wherein control information transmitted to the remote image input/output apparatus by said print control step includes information used in disabling selection information of recording sheet size previously set by the remote image input/output apparatus.

42. An output control method of a local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:

a device selection step of selecting the remote image input/output apparatus for printing the image data read by the first scanner unit;

a judgment step of judging whether or not recording sheet size set in the remote image input/output apparatus selected by said device selection step is coincided with recording sheet size being selected by the own image input/output apparatus; and a setting step of disabling the recording sheet size being selected by the own image input/output apparatus in a case where it is detected that the two recording sheet sizes are not coincided with each other by said judgment step and performing setting related to sheet size selection so as to select output sheet size on the basis of data size of the image data to be read by the first scanner unit.

43. An image input/output system which includes an image input/output apparatus for outputting inputted image data and another image input/output apparatus capable of communicating with the image input/output apparatus through a communication medium, wherein the image input/output apparatus comprising:

image input means for inputting image data;

display means for displaying sheet information of recording sheets commonly held by the another image input/output apparatus and the own image input/output apparatus for outputting the image data inputted by said image input means;

first sheet selection means for selecting output sheet size used in outputting the image data on the basis of the sheet information displayed by said display means; and output control means for controlling the own image input/output apparatus and the another image input/output apparatus to output the image data on sheets of which size corresponds to the output sheet size selected by said first sheet selection means, while the another image input/output apparatus comprising:

setting means for performing setting related to sheet size selection;

calculation means for calculating data size of the inputted image data; and second sheet selection means for selecting output sheet size on the basis of a calculation result obtained by said calculation means and the setting set by said setting means, wherein in a case where an image output request according to said output control means is received, the setting set by said setting means is disabled, and said calculation means calculates the data size of the image data transferred from the another image input/output apparatus and said second sheet selection means selects the output sheet size on the basis of the calculation result obtained by said calculation means.

44. An image input/output system which includes an image input/output apparatus for outputting inputted image data and another image input/output apparatus capable of communicating with the image input/output apparatus through a communication medium, wherein the image input/output apparatus comprising:

image input means for inputting image data;

device selection means for selecting the another image input/output apparatus for outputting the image data inputted by said image input means;

judgment means for judging whether or not recording sheet size set in the another image input/output apparatus selected by said device selection means is coincided with recording sheet size being selected by the own image input/output apparatus; and first setting means for disabling the recording sheet size being selected by the own image input/output apparatus in a case where it is detected that the two recording sheet sizes are not coincided with each other by said judgment means and performing setting related to sheet size selection so as to select output sheet size on the basis of data size of the image data inputted by said image input means, while the another image input/output apparatus comprising:

second setting means for performing setting related to sheet size selection;

calculation means for calculating data size of the inputted image data; and sheet selection means for selecting output sheet size on the basis of a calculation result obtained by said calculation means and the setting set by said setting means, wherein in a case where an image output request of outputting image data inputted by the another image input/output apparatus using the another image input/output apparatus and the own image input/output apparatus is received, the setting set by said second setting means is disabled, and said calculation means calculates the data size of the image data transferred from the another image input/output apparatus and said sheet selection means selects the output sheet size on the basis of the calculation result obtained by said calculation means.

45. An image input/output system which includes an image input/output apparatus for outputting inputted image data and another image input/output apparatus capable of communicating with the image input/output apparatus through a communication medium, wherein the image input/output apparatus comprising:

image input means for inputting image data;

display means for displaying sheet information of recording sheets commonly held by the another image input/output apparatus and the own image input/output apparatus for outputting the image data inputted by said image input means;

sheet selection means for selecting output sheet size used in outputting the image data on the basis of the sheet information displayed by said display means; and first output control means for controlling the own image input/output apparatus and the another image input/output apparatus to output the image data on sheets of which size corresponds to the output sheet size selected by said sheet selection means, while the another image input/output apparatus comprising:

judgment means for judging whether or not an image output request to be issued by said first output control means is received from the another image input/output apparatus; and second output control means for controlling an output condition of image data transferred from the another image input/output apparatus, wherein said output control means disables sheet selection setting according to the own image input/output apparatus in case of judging that the image output request is received by said judgment means.

46. An image input/output system which includes an image input/output apparatus for outputting inputted image data and another image input/output apparatus capable of communicating with the image input/output apparatus through a communication medium, wherein the image input/output apparatus comprising:

first judgment means for judging whether or not recording sheet size set in the another image input/output apparatus is coincided with recording sheet size being selected by the own image input/output apparatus in case of outputting the image data inputted by the own image input/output apparatus and the another image input/output apparatus; and sheet selection means for disabling the recording sheet size being selected by the own image input/output apparatus in a case where it is detected that the two recording sheet sizes are not coincided with each other by said first judgment means and selecting output sheet size on the basis of data size of the inputted image data, while the another image input/output apparatus comprising:

second judgment means for judging whether or not an image output request using the another image input/output apparatus and the own image input/output apparatus is received from the another image input/output apparatus; and output control means for controlling an output condition of image data transferred from the another image input/output apparatus, wherein said output control means disables sheet selection setting according to the own image input/output apparatus in case of judging that the image output request is received by said second judgment means.

47. An image input/output system which includes a local image input/output apparatus having a first scanner unit for reading image data of originals and a first printer unit for feeding output sheets from a sheet feed stage storing recording sheets and printing the image data on the output sheets, and a remote image input/output apparatus having a second scanner unit and a second printer unit capable of communicating with the local image input/output apparatus through a predetermined network, wherein the local image input/output apparatus comprising:

display means for displaying sheet information of recording sheets commonly held by the remote image input/output apparatus and the own image input/output apparatus for printing the image data read by the first scanner unit;

first sheet selection means for selecting print sheet size used in printing the image data on the basis of the sheet information displayed by said display means; and print control means for controlling the own image input/output apparatus and the remote image input/output apparatus to print the image data on sheets of which size corresponds to the output sheet size selected by said first sheet selection means, while the remote image input/output apparatus comprising:

setting means for setting recording sheet size to be selected in output sheet size selection based on size of input image data;

calculation means for calculating data size of the input image data;

second sheet selection means for selecting output sheet size used in printing the input image data by the second printer unit among recording sheet sizes set to be selected by said setting means on the basis of a calculation result obtained by said calculation means; and judgment means for judging whether or not an image output request to be issued by said print control means is received from the local image input/output apparatus, wherein the setting set by said setting means is disabled in case of judging that the image output request is received by said judgment means, and said calculation means calculates data size of image data transferred from the local image input/output apparatus, said second sheet selection means selects the output sheet size on the basis of the calculation result obtained by said calculation means, and the first printer unit prints the transferred image data on a sheet of which size corresponds to the output sheet size selected by said sheet selection means.

48. An image input/output system which includes a local image input/output apparatus having a first scanner unit for reading image data of originals and a first printer unit for feeding output sheets from a sheet feed stage storing recording sheets and printing the image data on the output sheets, and a remote image input/output apparatus having a second scanner unit and a second printer unit capable of communicating with the local image input/output apparatus through a predetermined network, wherein the local image input/output apparatus comprising:

device selection means for selecting the remote image input/output apparatus for printing the image data read by the first scanner unit;

first judgment means for judging whether or not recording sheet size set in the remote image input/output apparatus selected by said device selection means is coincided with recording sheet size being selected by the own image input/output apparatus; and first setting means for disabling the recording sheet size being selected by the own image input/output apparatus in a case where it is detected that the two recording sheet sizes are not coincided with each other by said first judgment means and performing setting related to sheet size selection so as to select output sheet size on the basis of data size of the image data to be read by the first scanner unit, while the remote image input/output apparatus comprising:

second setting means for setting recording sheet size to be selected in output sheet size selection based on size of input image data;

calculation means for calculating data size of the input image data;

sheet selection means for selecting output sheet size used in printing the input image data by the second printer unit among recording sheet sizes set to be selected by said second setting means on the basis of a calculation result obtained by said calculation means; and second judgment means for judging whether or not a cascade copy request for image data read by the first scanner unit using the first printer unit and the second printer unit is received from the local image input/output apparatus, wherein the setting set by said second setting means is disabled in case of judging that the cascade copy request is received by said second judgment means, and said calculation means calculates data size of image data transferred from the local image input/output apparatus, said sheet selection means selects the output sheet size on the basis of the calculation result obtained by said calculation means, and the second printer unit prints the transferred image data on a sheet of which size corresponds to the output sheet size selected by said sheet selection means.

49. A computer-readable storage medium which stores program codes for an image output method of an image input/output apparatus capable of communicating with another image input/output apparatus through a communication medium for outputting inputted image data, comprising:

a setting code of performing setting related to sheet size selection;

a calculation code of calculating data size of the inputted image data; and a sheet selection code of selecting output sheet size on the basis of a calculation result obtained by said calculation code and the setting set by said setting code, wherein in a case where an image output request of outputting image data inputted by the another image input/output apparatus using the another image input/output apparatus and the own image input/output apparatus is received, the setting set by said setting code is disabled, and said calculation code calculates the data size of the image data transferred from the another image input/output apparatus and said sheet selection code selects the output sheet size on the basis of the calculation result obtained by said calculation code.

50. A computer-readable storage medium which stores program codes for an image output method of an image input/output apparatus capable of communicating with another image input/output apparatus through a communication medium for outputting inputted image data, comprising:

an image input code of inputting image data;

a display code of displaying sheet information of recording sheets commonly held by the another image input/output apparatus and the own image input/output apparatus for outputting the image data inputted by said image input code on a display;

a sheet selection code of selecting output sheet size used in outputting the image data on the basis of the sheet information displayed by said display code;

an output control code of controlling the own image input/output apparatus and the another image input/output apparatus to output the image data on sheets of which size corresponds to the output sheet size selected by said sheet selection code, wherein control information to be transmitted to the another image input/output apparatus by said output control code includes information used in disabling selection setting of recording sheet size according to the another image input/output apparatus.

51. A computer-readable storage medium which stores program codes for an image output method of an image input/output apparatus capable of communicating with another image input/output apparatus through a communication medium for outputting inputted image data, comprising:

an image input code of inputting image data;

a device selection code of selecting the another image input/output apparatus for outputting the image data inputted by said image input code;

a judgment code of judging whether or not recording sheet size set in the another image input/output apparatus selected by said device selection code is coincided with recording sheet size being selected by the own image input/output apparatus; and a setting code of disabling the recording sheet size being selected by the own image input/output apparatus in a case where it is detected that the two recording sheet sizes are not coincided with each other by said judgment code and performing setting related to sheet size selection so as to select output sheet size on the basis of data size of the image data inputted by said image input code.

52. A computer-readable storage medium which stores program codes for an image output method of an image input/output apparatus capable of communicating with another image input/output apparatus through a communication medium for outputting inputted image data, comprising:

a judgment code of judging whether or not an image output request using the another image input/output apparatus and the own image input/output apparatus is received from the another image input/output apparatus; and an output control code of controlling an output condition of image data transferred from the another image input/output apparatus, wherein said output control code disables sheet selection setting according to the own image input/output apparatus in case of judging that the image output request is received by said judgment code.

53. A computer-readable storage medium which stores program codes for an image output method of an image input/output apparatus capable of communicating with another image input/output apparatus through a communication medium for outputting inputted image data, comprising:

an image input code of inputting image data;

a display code of displaying sheet information of recording sheets commonly held by the another image input/output apparatus and the own image input/output apparatus for outputting the image data inputted by said image input code on a display;

a sheet selection code of selecting output sheet size used in outputting the image data on the basis of the sheet information displayed by said display code; and an output control code of controlling the own image input/output apparatus and the another image input/output apparatus to output the image data on sheets of which size corresponds to the output sheet size selected by said sheet selection code.

54. A computer-readable storage medium which stores program codes for an image output method of an image input/output apparatus capable of communicating with another image input/output apparatus through a communication medium for outputting inputted image data, comprising:
- a judgment code of judging whether or not recording sheet size set in the another image input/output apparatus is coincided with recording sheet size being selected by the own image input/output apparatus in case of outputting the image data inputted by the own image input/output apparatus and the another image input/output apparatus; and
- a sheet selection code of disabling the recording sheet size being selected by the own image input/output apparatus in a case where it is detected that the two recording sheet sizes are not coincided with each other by said judgment code and selecting output sheet size on the basis of data size of the inputted image data.

55. A computer-readable storage medium which stores program codes for an output control method of a remote image input/output apparatus, which has a second scanner unit for reading image data of originals and a second printer unit for feeding output sheets from a sheet feed stage storing recording sheets and printing the image data on the output sheets, capable of communicating with a local image input/output apparatus which has a first scanner unit and a first printer unit through a predetermined network, comprising:
- a setting code of setting recording sheet size to be selected in output sheet size selection based on size of input image data;
- a calculation code of calculating data size of the input image data;
- a sheet selection code of selecting output sheet size used in printing the input image data by the second printer unit among recording sheet sizes set to be selected by said setting code on the basis of a calculation result obtained by said calculation code; and
- a judgment code of judging whether or not a cascade copy request for image data read by the first scanner unit using the first printer unit and the second printer unit is received from the local image input/output apparatus,
- wherein the setting set by said setting code is disabled in case of judging that the cascade copy request is received by said judgment code, and said calculation code calculates data size of image data transferred from the local image input/output apparatus, said sheet selection code selects the output sheet size on the basis of the calculation result obtained by said calculation code, and the second printer unit prints the transferred image data on a sheet of which size corresponds to the output sheet size selected by said sheet selection code.

56. A computer-readable storage medium which stores program codes for an output control method of a local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:
- a display code of displaying sheet information of recording sheets commonly held by the remote image input/output apparatus and the own image input/output apparatus for printing the image data read by the first scanner unit on a display;
- a sheet selection code of selecting print sheet size used in printing the image data on the basis of the sheet information displayed by said display code; and
- a print control code of controlling the own image input/output apparatus and the remote image input/output apparatus to print the image data on sheets of which size corresponds to the output sheet size selected by said sheet selection code,
- wherein control information transmitted to the remote image input/output apparatus by said print control code includes information used in disabling selection information of recording sheet size previously set by the remote image input/output apparatus.

57. A computer-readable storage medium which stores program codes for an output control method of a local image input/output apparatus, which has a first scanner unit for reading image data of originals and a first printer unit for feeding output sheets from a sheet feed stage storing recording sheets and printing the image data on the output sheets, capable of communicating with a remote image input/output apparatus which has a second scanner unit and a second printer unit through a predetermined network, comprising:
- a device selection code of selecting the remote image input/output apparatus for printing the image data read by the first scanner unit;
- a judgment code of judging whether or not recording sheet size set in the remote image input/output apparatus selected by said device selection code is coincided with recording sheet size being selected by the own image input/output apparatus; and
- a setting code of disabling the recording sheet size being selected by the own image input/output apparatus in a case where it is detected that the two recording sheet sizes are not coincided with each other by said judgment code and performing setting related to sheet size selection so as to select output sheet size on the basis of data size of the image data to be read by the first scanner unit.

* * * * *